United States Patent
Ochiai et al.

(10) Patent No.: US 9,743,650 B2
(45) Date of Patent: Aug. 29, 2017

(54) RECIPROCATING MECHANISM FOR A FISHING REEL

(71) Applicant: Shimano Inc., Sakai, Osaka (JP)

(72) Inventors: Koji Ochiai, Osaka (JP); Shingo Matsuo, Osaka (JP); Hirokazu Hashimoto, Osaka (JP); Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 430 days.

(21) Appl. No.: 14/475,921

(22) Filed: Sep. 3, 2014

(65) Prior Publication Data

US 2015/0090820 A1    Apr. 2, 2015

(30) Foreign Application Priority Data

Oct. 1, 2013 (JP) ................................. 2013-206304
Jan. 9, 2014 (JP) ................................. 2014-002286

(51) Int. Cl.
    *A01K 89/01* (2006.01)
(52) U.S. Cl.
    CPC ............................... *A01K 89/0114* (2013.01)
(58) Field of Classification Search
    CPC ............... A01K 89/01; A01K 89/0114; A01K 89/01141; A01K 89/01142; A01K 89/01143; A01K 89/01917
    See application file for complete search history.

(56) References Cited

U.S. PATENT DOCUMENTS

| | | | | | |
|---|---|---|---|---|---|
| 5,316,239 | A | * | 5/1994 | Sugawara | A01K 89/0114 242/241 |
| 5,775,612 | A | * | 7/1998 | Hashimoto | A01K 89/0114 242/241 |
| 5,934,586 | A | * | 8/1999 | Kang | A01K 89/0114 242/241 |
| 6,290,157 | B1 | * | 9/2001 | Shibata | A01K 89/0114 242/241 |

(Continued)

FOREIGN PATENT DOCUMENTS

| | | |
|---|---|---|
| JP | 2000-279072 A | 10/2000 |
| JP | 2004-236595 A | 8/2004 |

(Continued)

OTHER PUBLICATIONS

European Search Report of corresponding EP Application No. 14 18 6642.6 Feb. 11, 2015.

(Continued)

*Primary Examiner* — Emmanuel M Marcelo
(74) *Attorney, Agent, or Firm* — Global IP Counselors, LLP

(57) ABSTRACT

An oscillating mechanism includes a traverse camshaft, an engaging unit, and a slider body. The traverse camshaft includes a spiral groove. The traverse camshaft rotates in conjunction with the winding operation of a handle attached to the reel main body. The engaging unit includes an engaging claw configured to engage the spiral groove. The slider body includes a supporting hole rotatably supporting the engaging unit. A groove extends in the penetration direction of the supporting hole, and is disposed on the inner peripheral surface of the supporting hole of the slider body.

17 Claims, 15 Drawing Sheets

(56) References Cited

U.S. PATENT DOCUMENTS

| | | | | |
|---|---|---|---|---|
| 6,382,541 | B1 * | 5/2002 | Liu ................... | A01K 89/0114 242/241 |
| 7,293,731 | B2 * | 11/2007 | Kitajima ............ | A01K 89/0114 242/241 |
| 2003/0146322 | A1 * | 8/2003 | Kitajima ............ | A01K 89/0114 242/249 |

FOREIGN PATENT DOCUMENTS

| | | |
|---|---|---|
| JP | 2007-97576 A | 4/2007 |
| JP | 2010-172272 A | 8/2010 |

OTHER PUBLICATIONS

Office Action of corresponding EP Application No. 14 18 6642.6 dated Aug. 26, 2016.
Office Action of corresponding Japanese patent application No. 2013-206304 dated Jun. 20, 2017.

* cited by examiner

RECIPROCATING MECHANISM FOR A FISHING REEL

CROSS-REFERENCE TO RELATED APPLICATIONS

This application claims priority to Japanese Patent Application Nos. 2013-206304 filed on Oct. 1, 2013 and 2014-002286 filed on Jan. 9, 2014, the entirety of which are hereby incorporated by reference in their entirety.

BACKGROUND OF THE INVENTION

Field of the Invention

The present invention relates to a reciprocating mechanism for a fishing reel and, in particular, relates to a reciprocating mechanism for a fishing reel in which a spool onto which fishing line is wound is reciprocally moved with respect to a reel main body.

Background Art

A conventional fishing reel, for example, a spinning reel, includes a reciprocating mechanism that reciprocally moves a spool back and forth in conjunction with the rotation of a handle (see Japanese Laid-Open Patent Publication No. 2010-172272). The reciprocating mechanism comprises a traverse camshaft, an engaging unit, and a sliding unit. Spiral cam grooves are formed on the traverse camshaft. The engaging unit comprises engaging claws. The engaging claws engage with the cam grooves of the traverse camshaft. The engaging unit is attached to the sliding unit. The sliding unit is coupled to a spool shaft and is movable in the axial direction of the traverse camshaft along with the spool shaft.

In such a reciprocating mechanism, the engaging claws of the engaging unit engage the cam grooves of the traverse camshaft. With this structure, when the traverse camshaft rotates, the sliding unit reciprocally moves back and forth along the camshaft of the traverse camshaft via the engaging unit.

SUMMARY

In this type of reciprocating mechanism, the engaging unit is attached to the sliding unit. In particular, the engaging unit is inserted in a supporting hole of the sliding unit from outside of the sliding unit toward the traverse camshaft. The engaging unit is also rotatably supported by the supporting hole of the sliding unit via an axle bearing, bush, etc., and the supporting hole of the sliding unit is blocked by a plate member in a state in which the engaging claws of the engaging unit are engaged with the cam grooves of the traverse camshaft, and the plate member is fixed to the sliding unit by a screw member.

In a reciprocating mechanism that is assembled in this way, for example, as shown in FIG. 11b, the entire portion of the engaging claws 425, where the engaging claws 425 engage the spiral grooves (all of the distal end portion 425a of the engaging claws 425), is disposed inside of the spiral grooves 421a. Therefore, in a direction away from the bottom of the spiral groove 421a, the length T2 of both end portions 428 at the distal end portion 425a of the engaging claws 425 are shorter than the depth F2 of the spiral grooves 421a.

For this reason, when the engaging claws 425 move along the spiral grooves 421a, the entire distal end portion 425a of the engaging claws 425 (the portion between the two end portions) will move along the wall part of the spiral grooves. Thus, when the front end portion of the distal end of the engaging claws move along the wall part of the spiral grooves, the edge of this front end portion of the distal end will slide along the wall part of the spiral grooves 421a or will make contact with the wall part of the spiral grooves. There is the risk that the slider body will not smoothly move due to the sliding resistance and the impact resistance of this edge. In particular, there is the risk that a burr will form on the edge of the front end portion of the distal end of the engaging claw; when a burr is formed, the slider body may have difficulty moving smoothly.

In this structure, the engaging claw can more smoothly move along the cam grooves of the traverse camshaft when the width of the engaging claw of the engaging unit (the engaging range) is widely formed. That is, the slider configured by the engaging unit and the sliding unit can reciprocally move in a smooth manner.

However, as mentioned above, in an assembled reciprocating mechanism, the engaging unit is inserted in a supporting hole of the sliding unit from the outside of the sliding unit toward the traverse camshaft.

In this structure, the diameter of the supporting hole of the sliding unit must be at least the width of the engaging claw of the engaging unit, so there is the possibility that the sliding unit itself will be large. This has been one problem in trying to reduce the size of a spinning reel.

The present invention was made in light of the problems mentioned above, and the object of the present invention is to reduce the size of the sliding unit in a reciprocating mechanism for a fishing reel without decreasing the smooth movement of the sliding unit.

The reciprocating mechanism for a fishing reel according to a first aspect of the present invention is for reciprocating a spool onto which the fishing line is wound with respect to the reel main body.

The present reciprocating mechanism comprises a traverse camshaft and an engaging unit. The traverse camshaft rotates in conjunction with the winding operation of a handle that is attached to the reel main body. The traverse camshaft comprises cam grooves. The engaging unit comprises engaging claws that engage the cam grooves of the traverse camshaft. The front end portion of the engaging claw in the direction along the cam grooves is longer than the depth of the cam grooves.

In the present reciprocating mechanism, the front end portion of the engaging claws in the direction along the cam grooves is longer than the depth of the cam grooves, so that the engaging claws can be moved along the cam grooves with the surface contact between the engaging claw and the cam grooves. For example, the engaging claws can be moved along the cam grooves in a state in which the edge portion of the front end portion of the engaging claws is disposed on the outside of the cam grooves. With this, the engaging claws can move smoothly along the cam grooves without the edge portion of the front end portion of the engaging claws interfering with the cam grooves. That is, the oscillating mechanism can be smoothly operated.

The reciprocating mechanism for a fishing reel according to a second aspect of the present invention comprises the reciprocating mechanism recited in the first aspect, with the front end portion of the engaging claws protruding in a direction away from the bottom of the cam grooves.

In this configuration, the engaging claws can move smoothly along the cam grooves with surface contact between the engaging claws and the cam grooves by protruding the front end portion of the engaging claws longer than the depth of the cam grooves as well as in a direction away from the bottom of the cam grooves. Additionally, since the edge portion of the front end portion of the engaging claws can be disposed on the outside of the cam grooves, the engaging claws can move smoothly along the cam grooves without the edge portion of the front end portion of the engaging claws interfering with the cam grooves.

The reciprocating mechanism for a fishing reel according to the third aspect of the present invention comprises the reciprocating mechanism recited in the first aspect or the second aspect, with the width between the front end portion of the engaging claws and the rear end portion of the engaging claws being larger than the diameter of the traverse camshaft.

In this configuration, since the width between the front end portion of the engaging claws and the rear end portion of the engaging claws is larger than the diameter of the traverse camshaft, the edge portion of the front end portion of the engaging claws can be securely disposed on the outside of the cam grooves. Thus, the engaging claws can move smoothly along the cam grooves without the edge portion of the front end portion of the engaging claws interfering with the cam grooves.

The reciprocating mechanism for a fishing reel according to a fourth aspect of the present invention comprises the reciprocating mechanism recited in any one of the first to the third aspects, with the engaging claws comprising a sliding portion that is disposed inside of the cam grooves and that can slide with the cam grooves, along with a non-sliding portion on the outside of the cam grooves.

In this configuration, the sliding portion of the engaging claws can slide smoothly along the cam grooves while being in surface contact with the cam grooves in a state in which the non-sliding portion is disposed on the outside of the cam grooves. Therefore, the engaging claws can move smoothly along the cam grooves without the edge portion of the front end portion of the engaging claws interfering with the cam grooves.

The reciprocating mechanism for a fishing reel according to a fifth aspect of the present invention comprises the reciprocating mechanism recited in the fourth aspect, with the sliding portion overlapping with the cam groove when seen from a direction along the traverse camshaft and with the non-sliding portion being disposed on the outside the cam groove.

In this configuration, since the sliding portion overlaps with the cam grooves, the sliding portion of the engaging claws can reliably be in surface contact with the cam grooves. Additionally, the non-sliding portion, for example the edge portion, can be reliably disposed on the outside of the cam groove.

The reciprocating mechanism for a fishing reel according to a sixth aspect of the present invention comprises the reciprocating mechanism recited in the fourth or the fifth aspect, with the non-sliding portion in the front end part of the engaging claws protruding from the sliding portion towards the outside of the cam grooves.

Additionally, since the edge portion of the front end portion of the engaging claws can be disposed on the outside of the cam grooves, the engaging claws can move smoothly along the cam grooves without the edge portion of the front end portion of the engaging claws interfering with the cam grooves.

The reciprocating mechanism for a fishing reel according to a seventh aspect of the present invention comprises the reciprocating mechanism recited in any one of the fourth to the sixth aspects, with the thickness of at least one part of the sliding portion in the front end portion of the engaging claws being larger than the thickness of the center portion of the engaging claws in the direction along the cam grooves.

In this configuration, the engaging claws can reliably make contact with the cam grooves, and the engaging claws can move smoothly along the cam grooves.

The reciprocating mechanism for a fishing reel according to an eighth aspect of the present invention comprises the reciprocating mechanism recited in the seventh aspect, with the thickest portion of the sliding portion being the portion opposing the corner of the opening side of the cam grooves.

In this configuration, when the engaging claws pass through the intersection of the cam grooves, the thickest portion of the sliding portion in the front end portion of the engaging claw can make contact with the corner of the opening side of the cam grooves. Thus, the backlash generated between the engaging claws and the cam grooves at the intersection of the cam grooves can be reliably suppressed. That is, the engaging claws can move smoothly along the cam grooves at the intersection of the cam grooves.

The reciprocating mechanism for a fishing reel according to a ninth aspect of the present invention comprises the reciprocating mechanism recited in any one of the first to the eighth aspects, with a recess formed at the center portion of the engaging claw in the direction along the cam grooves.

In this configuration, when the engaging claws pass through the cam grooves on the end side of the traverse camshaft, the recess formed in the center portion of the engaging claws can slide along the wall of the cam grooves. Thus, the engaging claws can move smoothly along the cam grooves on the end side of the traverse camshaft.

The reciprocating mechanism for a fishing reel according to a tenth aspect of the present invention comprises the reciprocating mechanism recited in any one of the first to the ninth aspects, with the rear end portion of the engaging claws in the direction along the cam grooves being longer than the depth of the cam grooves. The rear end portion of the engaging claws protrudes in at least a direction that is away from the bottom of the cam groove or the direction along the cam groove.

In this configuration, the engaging claws can be stably as well as smoothly moved along the cam grooves by configuring the rear end portion of the engaging claws in the same way as the front end portion.

The reciprocating mechanism for a fishing reel according to an eleventh aspect of the present invention comprises the reciprocating mechanism recited in any one of the first to the tenth aspects, further comprising a sliding unit having a supporting hole that rotatably supports the engaging unit and a groove that extends in the penetrating direction of the supporting hole disposed in the inner peripheral surface of the supporting hole of the sliding unit.

In this configuration, even if the width of the engaging claw of the engaging unit is formed so as to be wide, this engaging claw can engage the cam groove of the traverse camshaft by guiding the engaging claw along the groove. Thus, the engaging claw can be smoothly moved along the cam groove of the traverse camshaft. Additionally, since the groove only partially enlarges the inner peripheral surface of the supporting hole of the sliding unit, when compared to the case in which the entire diameter of the supporting hole of the sliding unit is enlarged, reducing the size of the sliding unit is possible.

The reciprocating mechanism for a fishing reel according to a twelfth aspect of the present invention comprises the reciprocating mechanism recited in the eleventh aspect, with the groove comprising a first groove and a second groove disposed so as to oppose the first groove.

In this configuration, the groove comprises a first groove and a second groove disposed so as to oppose the first groove. For this reason, even if the width of the engaging claw of the engaging unit is wide, this engaging claw can engage the cam groove of the traverse camshaft by guiding the engaging claw along the first groove and the second groove. Thus, the engaging claw can move smoothly move along the cam groove of the traverse camshaft. Additionally, since the first groove and the second groove only partially enlarge the inner peripheral surface of the supporting hole of the sliding unit, when compared to the case in which the entire diameter of the supporting hole of the sliding unit is enlarged, reducing the size of the sliding unit is possible.

The reciprocating mechanism for a fishing reel according to a thirteenth aspect of the present invention comprises the reciprocating mechanism recited in the twelfth aspect, with a straight line connecting the first groove and the second groove when seen from the penetrating direction of the supporting hole and intersecting the axis of the traverse camshaft.

In this configuration, by providing a first groove and a second groove to the supporting hole of the sliding unit so that a straight line connecting the first groove and the second groove will intersect with respect to the axis of the traverse camshaft, the first groove and the second groove can be disposed on the part where the wall thickness is relatively thick in the sliding unit; therefore, the size of the sliding unit can be reduced without reducing the strength of the sliding unit.

The reciprocating mechanism for a fishing reel according to a fourteenth aspect of the present invention comprises the reciprocating mechanism recited in the thirteenth aspect, with a straight line that connects the first groove and the second groove when seen from the penetrating direction of the supporting hole being orthogonal with respect to the axis of the traverse camshaft.

In this configuration, by providing a first groove and a second groove to the supporting hole of the sliding unit so that a straight line connecting the first groove and the second groove is orthogonal with respect to the axis of the traverse camshaft, the first groove and the second groove can be disposed on the part where the wall thickness is relatively thick in the sliding unit; therefore, the size of the sliding unit can be reduced without reducing the strength of the sliding unit.

The reciprocating mechanism for a fishing reel according to a fifteenth aspect of the present invention comprises the reciprocating mechanism recited in the thirteenth aspect, with the straight line that connects the first groove and the second groove when seen from the penetrating direction of the supporting hole intersecting the axis of the traverse camshaft at an angle that is between 40 degrees and 60 degrees.

In this configuration, by providing a first groove and a second groove to the supporting hole of the sliding unit so that a straight line connecting the first groove and the second groove is orthogonal with respect to the axis of the traverse camshaft, the first groove and the second groove can be disposed on the part where the wall thickness is relatively thick in the sliding unit; therefore, the size of the sliding unit can be reduced without reducing the strength of the sliding unit.

The reciprocating mechanism for a fishing reel according to a sixteenth aspect of the present invention comprises the reciprocating mechanism recited in any one of the twelfth to the fifteenth aspects, with the width of the engaging claws being longer than the diameter of the supporting hole. Additionally, the width of the engaging claw is shorter than the length of the line segment connecting the bottom of the first groove and the bottom of the second groove.

In this configuration, by forming the engaging claw so that the width of the engaging claw is longer than the diameter of the supporting hole and is shorter than the line segment connecting the bottom of the first groove and the bottom of the second groove, the engaging claw can be smoothly guided along the first groove and the second groove, and the engaging claw can engage the cam groove of the traverse camshaft.

The reciprocating mechanism for a fishing reel according to a seventeenth aspect of the present invention comprises the reciprocating mechanism recited in any one of the eleventh to the sixteenth aspects, with the engaging unit further comprising a support part that is rotatably supported by the supporting hole.

In this configuration, in the engaging unit, the support part is rotatably supported by the supporting hole of the sliding unit in a state in which the engaging claw is engaged with the traverse camshaft. Thus, the sliding unit can move smoothly along the traverse camshaft via the engaging unit.

The reciprocating mechanism for a fishing reel according to an eighteenth aspect of the present invention comprises the reciprocating mechanism recited in the seventeenth aspect, with the support part of the engaging unit being rotatably supported by a rotation support part that is disposed in the inner periphery of the supporting hole of the sliding unit.

In this configuration, the support part of the engaging unit can rotate smoothly with respect to the inner periphery of the sliding unit with the rotating member. That is, the engaging unit can move smoothly along the engaging unit via the engaging unit.

According to the present invention, in a reciprocating mechanism for a fishing reel, the sliding unit can be made small without decreasing the smoothness of the movement of the sliding unit.

BRIEF DESCRIPTION OF THE DRAWINGS

Referring now to the attached drawings which form a part of this original disclosure.

DETAILED DESCRIPTION OF THE EMBODIMENTS

Embodiment 1

Figure 1:
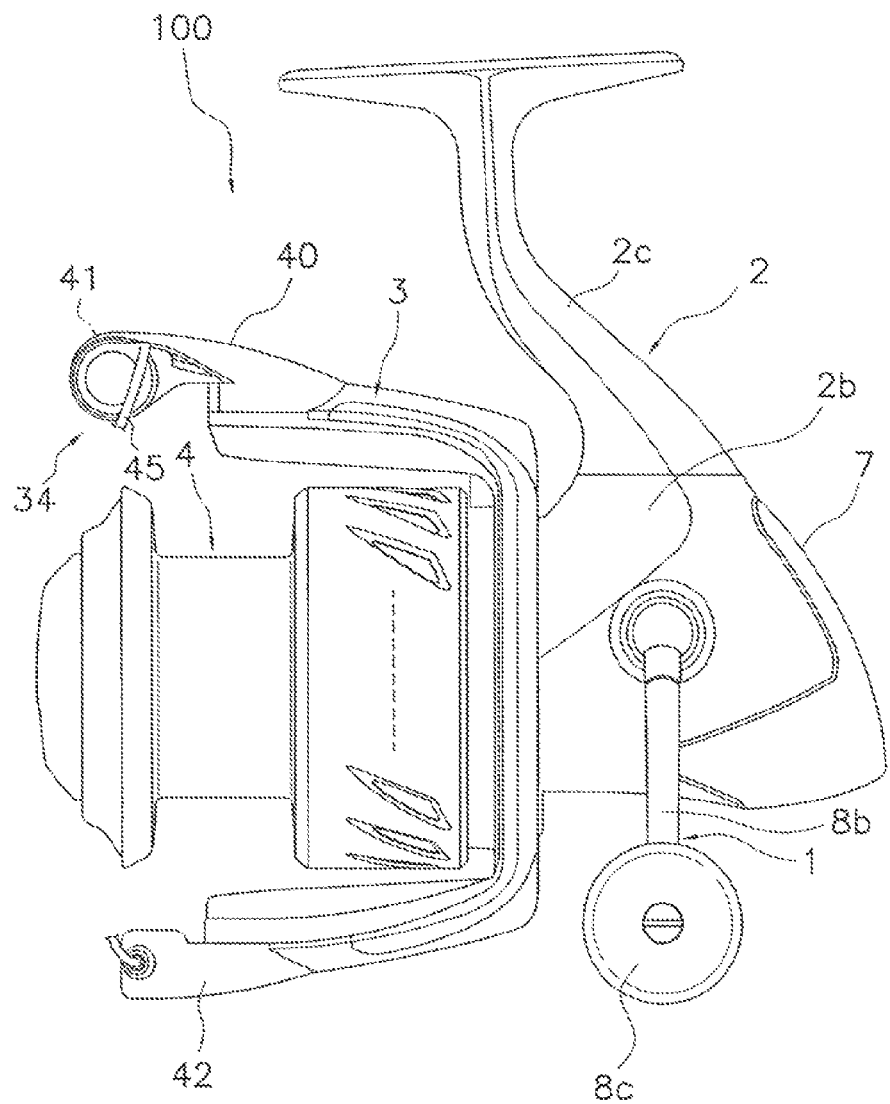
FIG. 1 is a side view of a spinning reel according to one embodiment of the present invention.
Figure 2:
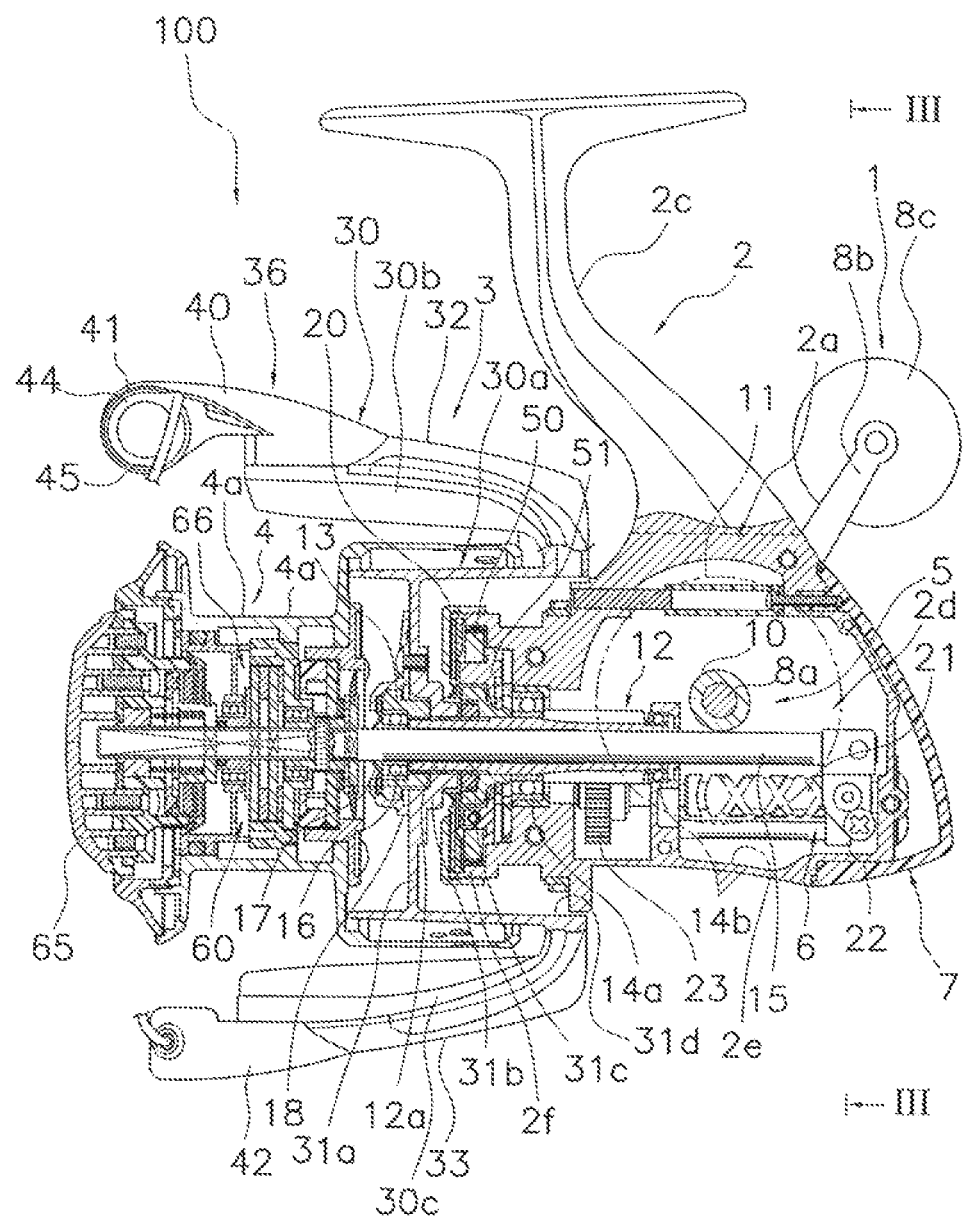
FIG. 2 is a side sectional view of the spinning reel.
Figure 3:
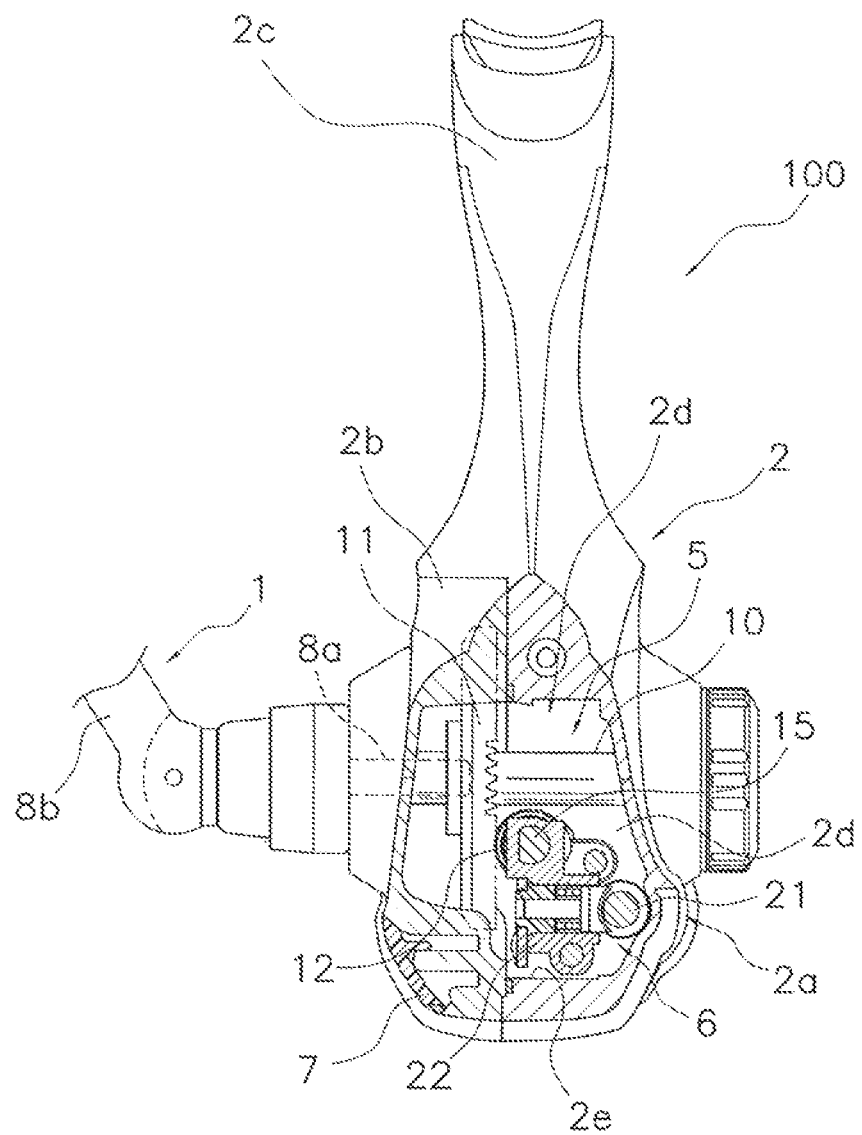
FIG. 3 is a cross-sectional view taken along the section line III-III in FIG. 2.

In FIG. 1, FIG. 2, and FIG. 3, a spinning reel 100 according to one embodiment of the present invention is for releasing the fishing line forward. The spinning reel 100 comprises a reel main body 2 that rotatably supports a handle 1, a rotor 3, a spool 4, a spool shaft 15, a rotor drive mechanism 5, and an oscillating mechanism 6 (one example of a reciprocating mechanism). The rotor 3 is rotatably supported by the front portion of the reel main body 2. The spool 4 has a reel body 4a to which fishing line is wound by a rotor 3. The spool 4 is disposed on the front portion of the rotor 3 so as to be able to move back and forth. A spool 4 is provided in the distal end of the spool shaft 15. The oscillating mechanism 6 reciprocally moves the spool 4 in the anteroposterior direction with the rotation of the handle 1 via the spool shaft 15. Meanwhile, the handle 1 can be attached not only to the left side of the reel main body 2, as shown in FIG. 1 and FIG. 3, but also on the right side of the reel main body 2.

The handle 1, as shown in FIG. 2 and FIG. 3, is pivotally mounted to the distal end of the handle shaft 8a. The handle 1 comprises a handle arm 8b that extends in a direction that intersects the handle shaft 8a and a handle grip 8c that is rotatably mounted to the distal end of the handle arm 8b.

Configuration of the Reel Main Body

As shown in FIG. 1 and FIG. 2, the reel main body 2 comprises a housing part 2a, a lid member 2b, a pole mounting part 2c, and a main body guard 7. The housing part 2a is made of, for example, an aluminum alloy or a magnesium alloy and has a mechanism mounting space 2d that is open. A rotor drive mechanism 5 that rotates the rotor 3 in conjunction with the rotation of the handle 1 and an oscillating mechanism 6 are disposed in the mechanism mounting space 2d. A pole mounting part 2c for attaching the fishing pole is integrally formed with the housing part 2a. Additionally, a cylindrical portion 2f is formed on the front portion of the housing part 2a.

The lid member 2b is made of, for example, an aluminum alloy or an magnesium alloy and is disposed so as to cover the opening 2e of the mechanism mounting space 2d to close the mechanism mounting space 2d. The pole mounting part 2c is a roughly T-shaped part that extends diagonally upward from the housing part 2a, after which this part extends in the anteroposterior direction. The pole mounting part 2c is integrally formed with the housing part 2a. Meanwhile, the pole mounting part 2c can be integrally formed with the lid member 2b. The main body guard 7 covers the rear surface, the rear side surface, and the rear bottom surface of the housing part 2a and the lid member 2b.

Configuration of the Rotor Drive Mechanism

The rotor drive mechanism 5, as shown in FIG. 2 and FIG. 3, comprises a drive shaft 10 to which is integrally and rotatably coupled the handle shaft 8a of the handle 1, a drive gear 11 that rotates along with the drive shaft 10, and a pinion gear 12 that meshes with the drive gear 11. The drive shaft 10 is, for example, a cylindrical shaft made of a stainless steel alloy. The drive shaft 10 is supported on both ends by axle bearings (not shown) that are mounted on the housing part 2a and lid member 2b. A female screw portion (not shown) is formed on the inner peripheral surface of both ends of the drive shaft 10. The drive gear 11 is, for example, in the form of a face gear and is integrally and rotatably disposed on the drive shaft 10. In this embodiment, the drive gear 11 is detachably disposed on the drive shaft 10. Meanwhile, the drive gear 11 can be integrally formed with the drive shaft 10.

The pinion gear 12 is, for example, a cylindrical member made of a stainless steel alloy. The front portion 12a of the pinion gear 12 extends through the center portion of the rotor 3, as shown in FIG. 2, and is integrally and rotatably fixed to the rotor 3 via a nut 13. A retainer 18 prevents the nut 13 from rotating. The retainer 18 is fixed to the rotor 3. The pinion gear 12 is rotatably supported by the housing part 2a by axle bearings 14a and 14b that are mounted at intervals in the axial direction.

Configuration of the Oscillating Mechanism

The oscillating mechanism 6 is a mechanism for reciprocally moving the spool 4 in the anteroposterior direction by moving the spool shaft 15 in the same direction. The oscillating mechanism 6, as shown in FIG. 2 to FIG. 5, comprises a traverse camshaft 21, a slider 22, and an intermediate gear 23.

Traverse Camshaft

Figure 5:
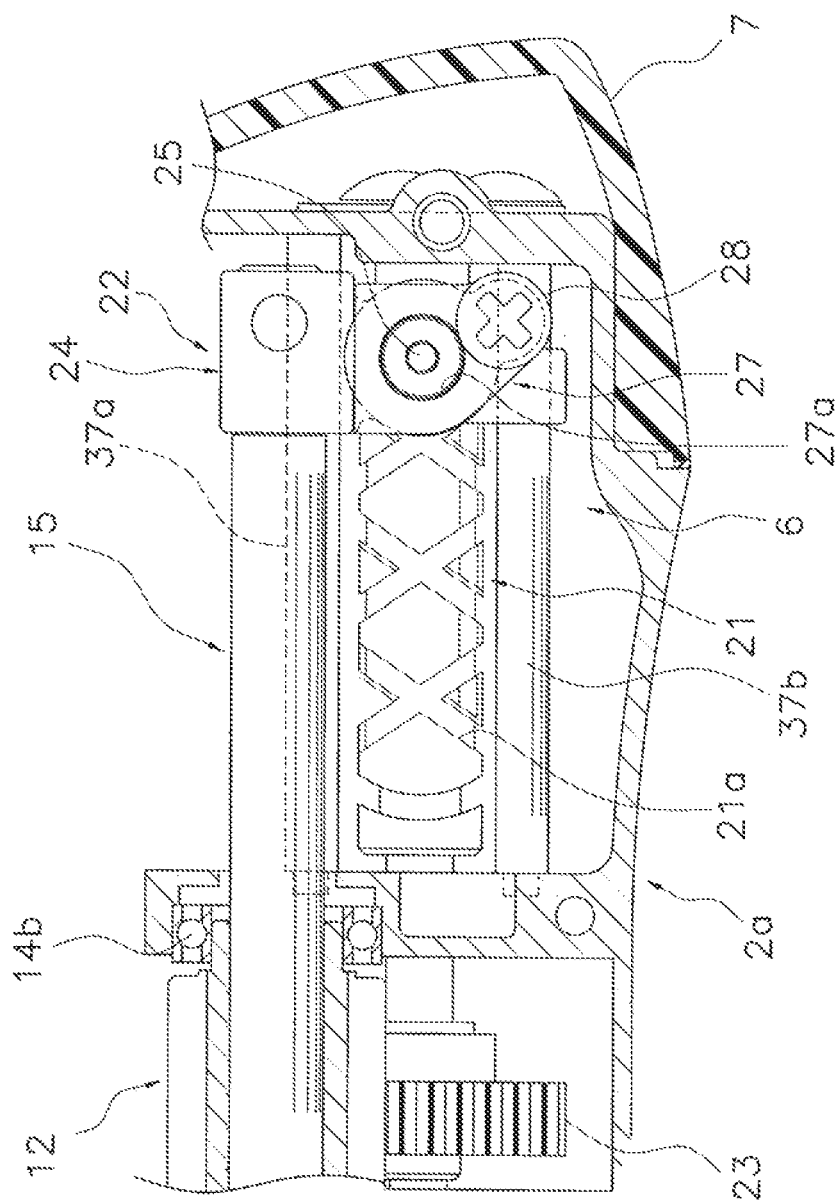
FIG. 5 is an enlarged sectional side view of an oscillating mechanism (one example of a reciprocating mechanism).

As shown in FIG. 2 and FIG. 3, the traverse camshaft 21 rotates in conjunction with the winding operation of the handle 1 mounted on the reel main body 2. The traverse camshaft 21 is disposed parallel to the spool shaft 15 and below the spool shaft 15 (the lower inner side in FIG. 2 and the lower right side in FIG. 3). The traverse camshaft 21 is disposed so that the shaft core will be along the anteroposterior direction. Both end portions of the traverse camshaft 21 are rotatably supported by the housing part 2a via a rolling bearing. As shown in FIG. 5, the traverse camshaft 21 comprises a spiral groove 21a. The spiral groove 21a is a groove that intersects with the outer peripheral surface of the traverse camshaft 21.

Slider

Figure 4:
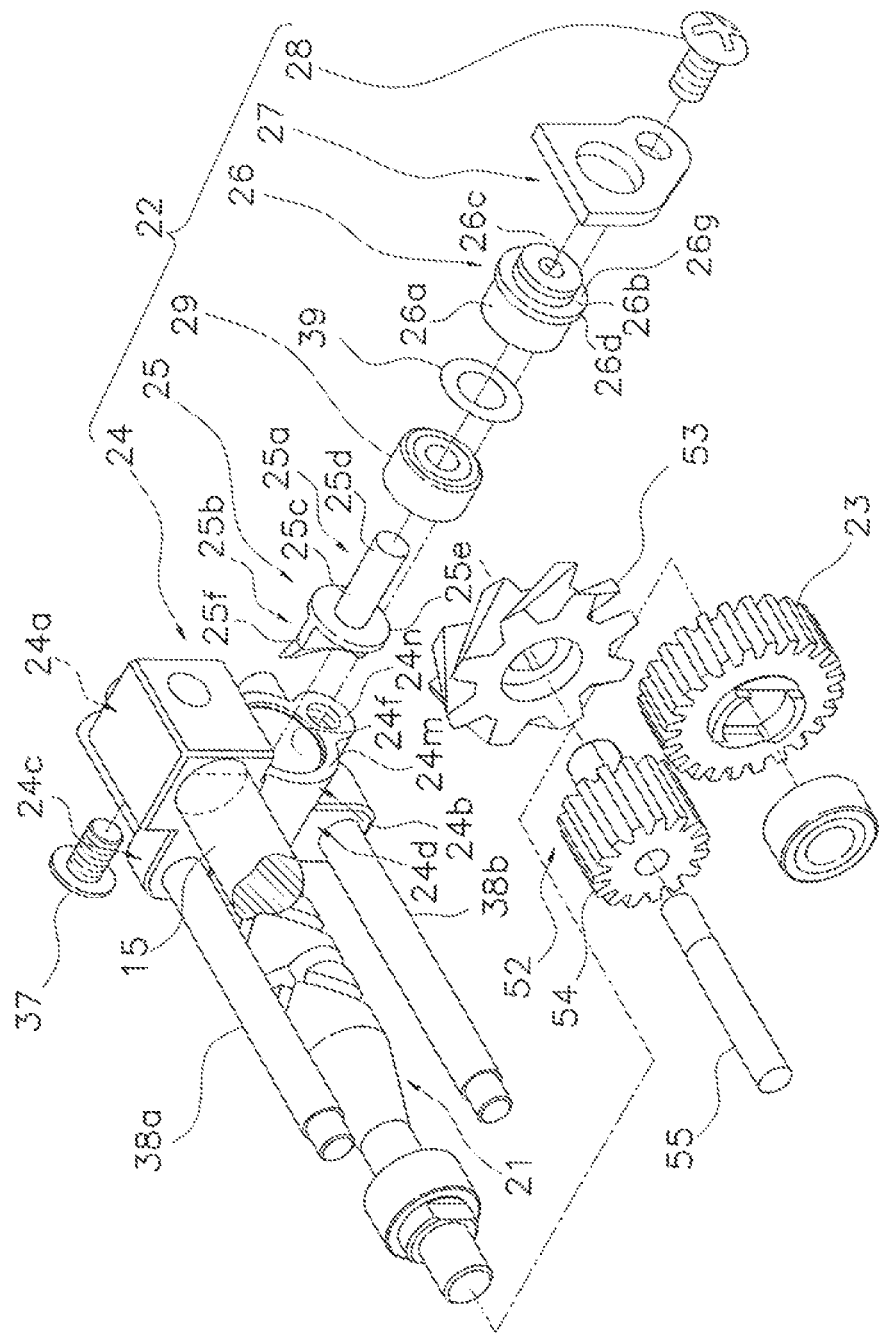
FIG. 4 is an exploded perspective view of an oscillating mechanism (one example of a reciprocating mechanism).
Figure 6:
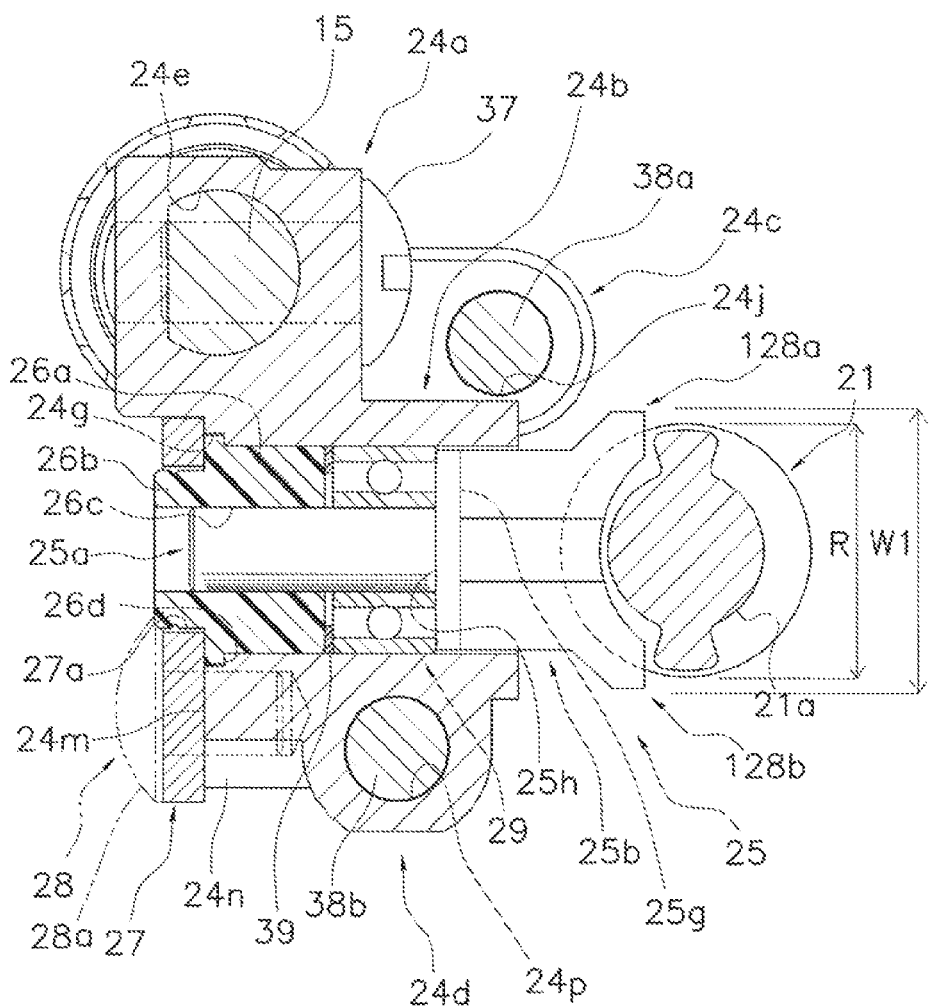
FIG. 6 is an enlarged sectional view of an oscillating mechanism (one example of a reciprocating mechanism) in FIG. 3.

The slider 22 moves in the anteroposterior direction along the traverse camshaft 21. The slider 22, as shown in FIG. 3, is disposed proximate to the drive gear 11. The slider 22, as shown in FIG. 4 to FIG. 6, comprises a slider body 24 (one example of a sliding unit), an engaging unit 25, a first axle bearing 26, a stopper member 27, a screw member 28, and a second axle bearing 29. The rear end of the spool shaft 15 is non-rotatably fixed to the slider 22.

As shown in FIG. 4, the slider body 24 comprises a spool shaft connecting portion 24a, an engaging unit mounting portion 24b, a first guide portion 24c and a second guide portion 24d. The rear end portion of the spool shaft 15 is non-rotatably coupled with the spool shaft connecting portion 24a. The engaging unit 25 is mounted on the engaging unit mounting portion 24b. The first guide portion 24c and the second guide portion 24d guide the slider body 24 in the anteroposterior direction.

As shown in FIG. 4, the spool shaft connecting portion 24a is roughly a rectangular, parallelepiped shape. As shown in FIG. 6, a spool shaft mounting hole 24e with a D-shaped cross section is formed in the spool shaft connecting portion 24a, extending through in the anteroposterior direction. The rear end portion of the spool shaft 15 is coupled to the spool shaft mounting hole 24e, and the spool shaft 15 is fixed by, for example, an adhesive. Additionally, the spool shaft can also be fixed by a screw member 37 that is screwed into the spool shaft 15. With this, the rear end portion of the spool shaft 15 is fixed to the slider body 24.

As shown in FIG. 4, the engaging unit mounting portion 24b is a generally cylindrical portion. The engaging unit mounting portion 24b comprises a through-hole 24f that is formed along the lateral direction that is essentially perpendicular to the traverse camshaft 21. As shown in FIG. 6, the through-hole 24f comprises a large diameter portion 24g that is formed on the end portion on the side away from the traverse camshaft 21. Additionally, the through-hole 24f comprises a regulating part (not shown) that regulates the movement and rotation range in the axial direction of the engaging unit 25. The regulating part protrudes in an arc shape toward the axis of the through-hole 24f.

Additionally, as shown in FIG. 6, the engaging unit mounting portion 24b comprises a disposing plane 24m to which the stopper member 27 is disposed. The disposing plane 24m is the end surface on the side of the engaging unit mounting portion 24b away from the traverse camshaft 21. The disposing plane 24m is formed to be recessed from the spool shaft connecting portion 24a to the traverse camshaft 21 side. A screw mounting portion 24n into which the screw member 28 is screwed is formed below the disposing plane 24m. The depth of the recess of the disposing plane 24m is the same as or larger than the sum of the thickness of the head 28a of the screw member 28 and the thickness of the stopper member 27.

As shown in FIG. 4, the first guide portion 24c protrudes from the wall surface of the spool shaft connecting portion 24a on the traverse camshaft 21 side. As shown in FIG. 6, a first guide hole 24j is formed in the first guide portion 24c. A first guide shaft 38a for guiding the slider 22 in the anteroposterior direction is inserted into the first guide hole 24j. Both ends of the first guide shaft 38a are supported by the housing part 2a.

As shown in FIG. 4, the second guide portion 24d protrudes downward from the lower surface of the engaging unit mounting portion 24b. As shown in FIG. 6, a second guide hole 24p is formed in the second guide portion 24d. A second guide shaft 38b for guiding the slider 22 in the anteroposterior direction is inserted into the second guide hole 24p. Both ends of the second guide shaft 38b are supported by the housing part 2a.

Thus, the traverse camshaft 21 is disposed between the first guide shaft 38a and the second guide shaft 38b in the vertical direction.

The engaging unit 25 is, for example, a rod-shaped metallic member. The engaging unit 25, as shown in FIG. 4 and FIG. 6, is disposed in the through-hole 24f of the engaging unit mounting portion 24b. The engaging unit 25 comprises an engaging portion 25b and a shaft portion 25a. The shaft portion 25a is integrally formed with the engaging portion 25b. The engaging portion 25b is disposed on the distal end portion of the shaft portion 25a and can engage with the spiral groove 21a.

Figure 11A:
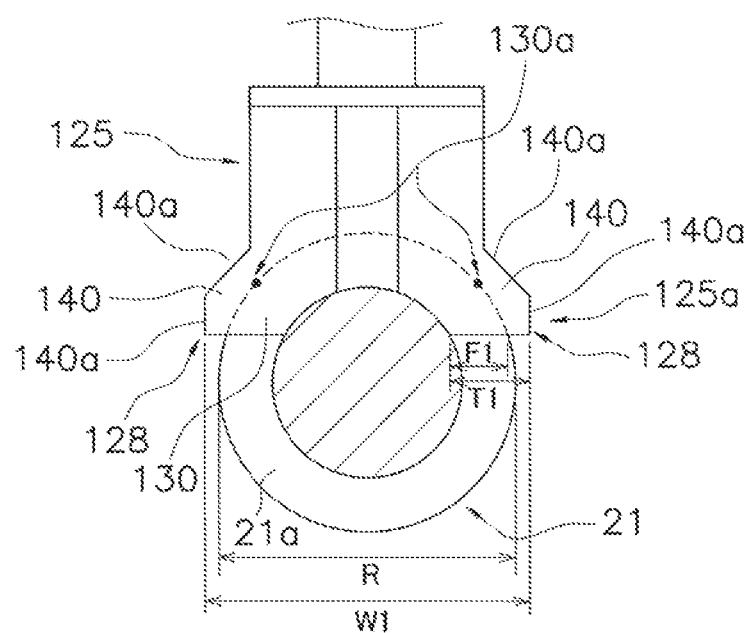
FIG. 11A is a side view showing the engagement relationship between the engaging unit and the traverse camshaft.

Here, the configuration of the present embodiment will be explained by comparing FIG. 11A corresponding to the present embodiment and FIG. 11B corresponding to a conventional technology (FIG. 6 of Japanese Laid-Open Patent Application No. 2010-172272). FIG. 11A is a schematic diagram to be compared with FIG. 11B. The reference symbols given in FIG. 11B are different from the reference symbols of FIG. 6 of the conventional technology, but their configurations are the same.

Figure 11B:
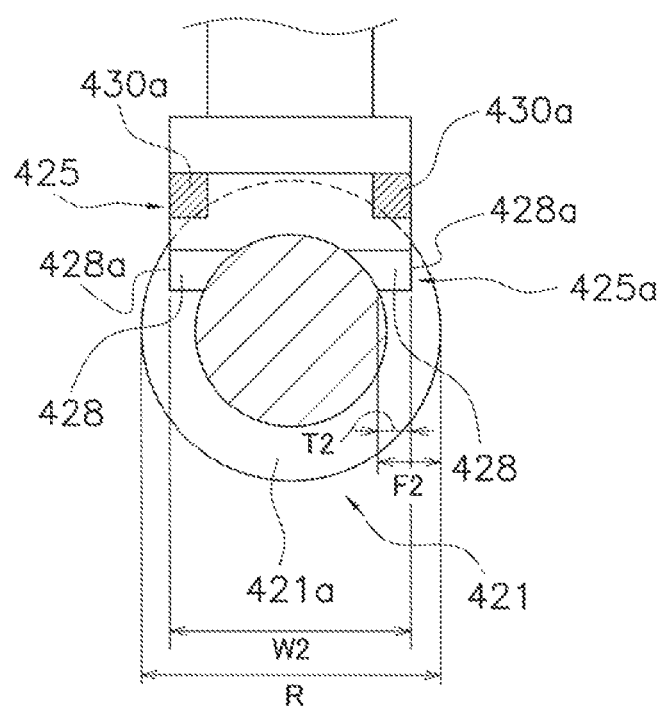
FIG. 11B is a side view showing the engagement relationship between the engaging unit of and the traverse camshaft.

As explained in the Conventional Technology section, in the conventional example shown in FIG. 11B, the distal end portion 425a of the engaging claw 425 is disposed inside of the spiral groove 421a. Additionally, in the direction away from the bottom of the spiral groove 421a, the length T2 of both end portions 428 of the engaging claw 425 at the distal end portion 425 is shorter than the depth F2 of the spiral groove 421a. That is, the entire distal end portion 425a of the engaging claw 425 functions as the sliding portion and slides with the spiral groove 421a. In contrast, in the present embodiment shown in FIG. 11A, the length of the both end portions in the distal end portion 125a of the engaging claw 125, for example, the protrusion length T1 of the protrusion 128, is longer than the depth F1 of the spiral groove 21a; therefore, in a state in which the non-sliding portion 140 of the protrusion 128 is disposed outside of the spiral groove 21a, the sliding portion 130 in the distal end portion 125a of the engaging claw 125 slides with the spiral groove 21a.

Additionally, in the conventional technology, the distal end portion 425a (the sliding portion) of the engaging claw 425, when seen from the direction along the traverse camshaft 21, overlaps with the spiral groove 21a. In contrast, in the present embodiment, the sliding portion 130 overlaps with the spiral groove 21a when seen from the direction along the traverse camshaft 21, and the non-sliding portion 140 of the protrusion 128 is disposed outside of the spiral groove 21a.

Also, in the conventional technology, the width W2 of both ends of the engaging claw 425 is smaller than the diameter R of the traverse camshaft 421. In contrast, in the present embodiment, the width W1 of the engaging claw 125 is larger than the diameter R of the traverse camshaft 21.

Figure 7:
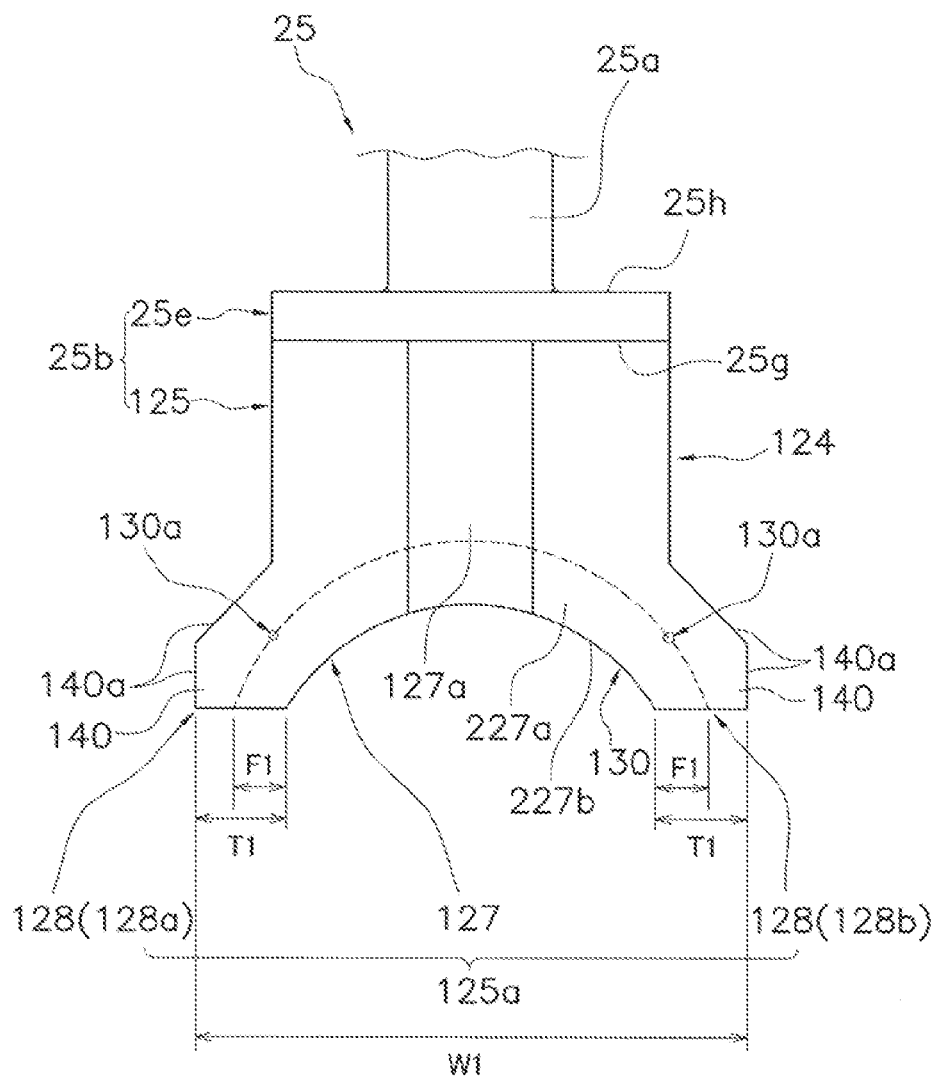
FIG. 7 is a partial side view of the engaging unit.

To explain the present embodiment in further detail, as shown in FIG. 7, the engaging unit 25b comprises a disc part 25e and engaging claws 125. The disc part 25e is formed to be larger in diameter than the shaft portion 25a. The disc part 25e is fitted to the through-hole 24f. A first surface 25g of the disc part 25e on the traverse camshaft 21 side makes contact with a regulating part (not diagrammed) that is formed inside of the through-hole 24f. With this, the movement of the engaging unit 25 to the traverse camshaft 21 side is regulated. That is, with the engaging portion 25b being positioned in the axial direction by the regulating part, the gap between the engaging portion 25b and the traverse camshaft 21 is kept constant.

Figure 8:
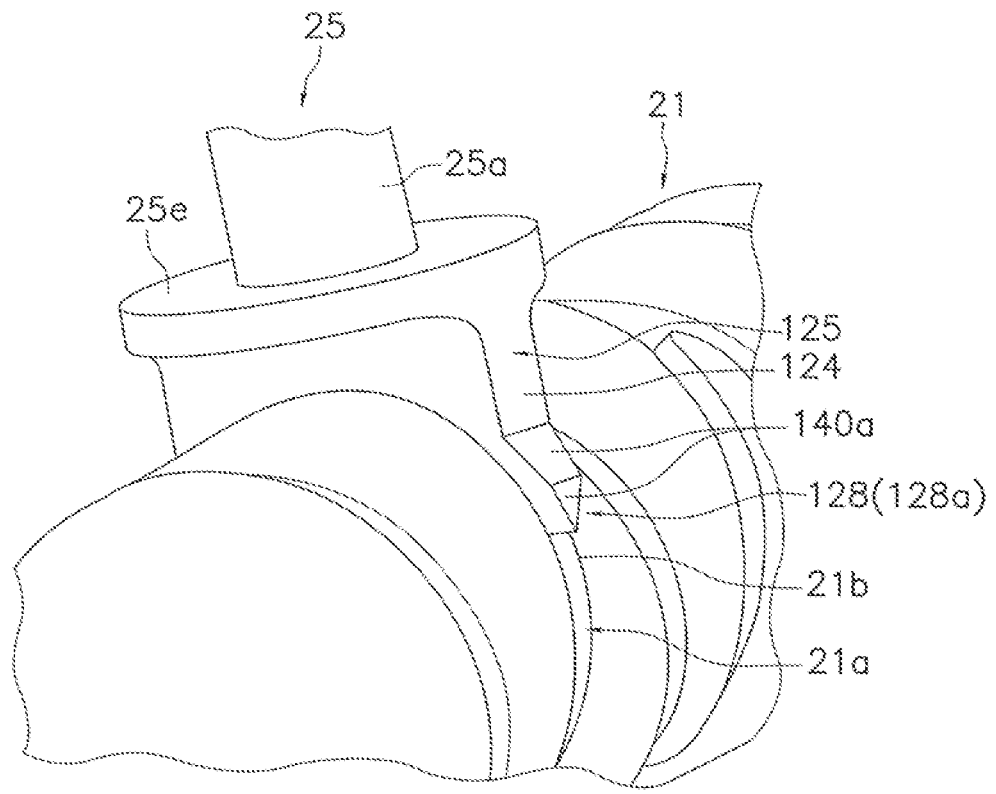
FIG. 8 is a perspective view showing the engagement relationship between the engaging unit and the traverse camshaft (part 1).

As shown in FIG. 7 and FIG. 8, the engaging claw 125 protrudes from the disc part 25e toward the traverse camshaft 21 in a plate-like shape and engages the spiral groove 21a. When the traverse camshaft 21 rotates, the engaging claw 125 is guided to the spiral groove 21a, and the slider 22 moves along the traverse camshaft 21 in the anteroposterior direction. For example, when the slider 22 moves along the traverse camshaft 21, one of the two ends of the engaging claw 125 is disposed in the direction in which the engaging unit 25 travels along the spiral groove 21a. Below, the end portion of the engaging claw 125 that is disposed in the traveling direction of the engaging unit 25 will be defined as the "front end." Additionally, the end portion of the engaging claw 125 that is disposed in the direction opposite to the traveling direction of the engaging unit 25 will be defined as the "rear end."

As shown in FIG. 7, the two side surfaces of the engaging claw 125 make contact with the arc-shaped portion of a regulating part, which is not shown. Thus, the rotation range of the engaging unit 25 is regulated. Additionally, both end portions of the engaging claw 125 protrude from the spiral groove 21a in a direction that is away from the bottom of the spiral groove 21a. The engaging claw comprises a proximal end portion 124 and a distal end portion 125a. The proximal end portion 124 is the portion between the disc part 25e and the distal end portion 125a. The proximal end portion 124 is integrally formed with the disc part 25e. The proximal end portion 124 is essentially formed in a rectangular plate shape. The distal end portion 125 is the portion that engages with the spiral groove 21a. The distal end portion 125a is essentially formed in an arc shape to go along the bottom of the spiral groove 21a. The distal end portion 125a is formed to be tapered from both side surfaces of the distal end portion 124.

The distal end portion 125a of the engaging claw 125 is formed to be wider than the proximal end portion 124 of the engaging claw 125. Both end portions of the distal end portion 125a are portions that correspond to the two end portions of the engaging claw 125 mentioned above, and they partially protrude from the spiral groove 21a in the direction away from the bottom of the spiral groove 21a. Specifically, the distal end portion 125a of the engaging claw 125 comprises a distal end center portion 127 and a pair of protrusions 128. The distal end center portion 127 is a portion that extends from the protrusions 124 toward the protrusions 21. Each of the pair of protrusions 128 is a portion that extends outwards from both sides of the distal end center portion 127. The protrusion 128 is integrally formed with the distal end center portion 127 so that at least one part of the protrusion 128 will protrude from the spiral groove 21a in a direction that is away from the bottom of the spiral groove 21a.

One of the pair of protrusions 128 corresponds with the above-described front end portion, and the other of the pair of protrusions 128 corresponds with the above-described rear end portion. That is, the protrusion 128 on the front end side (one example of the front end portion of the engaging claw) is an end portion that is disposed in the traveling direction of the slider 22. The protrusion 128 on the rear end side (one example of the rear end portion of the engaging claw) is an end portion that is disposed on the opposite side of the traveling direction of the slider 22. In FIG. 7, for example, the protrusion 128 on the left side is the front end side protrusion 128a, and the protrusion 128 on the right side is the rear end side protrusion 128b.

As shown in FIG. 7 and FIG. 8, a part of the front end side protrusion 128a and a part of the rear end side protrusion 128b protrude from the spiral groove 21a in the direction that is away from the bottom of the spiral groove 21a. In other words, the front end side protrusion 128a and the rear end side protrusion 128b are formed to be longer in the direction that is away from the bottom of the spiral groove 21a than the depth F1 of the spiral groove 21a. More specifically, as shown in FIG. 7, the protrusion length T1 of the front end side protrusion 128a and the rear end side protrusion 128b is longer than the depth F1 of the spiral groove 21a in the direction that is away from the bottom of the spiral groove 21a and in the direction that is perpendicular to the axis of the shaft portion 25a. Additionally, as shown in FIG. 6, the front end side protrusion 128a and rear end side protrusion 128b are provided so that the width W1 between the front end side protrusion 128a and the rear end side protrusion 128b is larger than then diameter R of the traverse camshaft 21.

Meanwhile, here, the protrusion length T1 of the protrusion 128b and the depth F1 of the spiral groove 21a are defined in the direction in which they are perpendicular to the axis of the shaft portion 25a; however, as long as this is a direction that is away from the bottom of the spiral groove 21a, the direction that defines the protrusion length T1 of the protrusion 128b and the depth F1 of the spiral groove 21a can be another direction.

Additionally, as shown in FIG. 7, a sliding part 130 that can slide in the spiral groove 21a and a non-sliding part 140 that is outside of the spiral groove 21a are disposed at the distal end portion 125a of the engaging claw 125 (the distal end center portion 127 and the protrusion 128).

The sliding part 130 comprises arc-shaped side surfaces 227a (only one side surface is diagrammed in FIG. 7) and an end surface 227b. The side surface 227a in the sliding part 130 is the surface opposing the wall of the spiral groove 21a. The end surface 227b in the sliding part 130 is the surface opposing the bottom of the spiral groove 21a. Additionally, the sliding part 130 overlaps with the spiral groove 21a when seen from the direction along the traverse camshaft 21. Meanwhile, in FIG. 7, the part that corresponds to the sliding part 130 is shown by the dashed line.

The thickness of at least one part of the both end portions of the engaging claw 125, for example, the thickness of at least a part of the sliding part 130 at both end portions of the distal end portion 125a, is larger than the thickness of the center part of the distal end center portion 127 in the direction along the spiral groove 21a. Additionally, the thickest portion 130a of the sliding part 130 (refer to FIG. 7) is the portion opposing the corner 21b of the opening side of the spiral groove 21a. The thickest portion 130a of the sliding part 130 is a part of the curved surface forming the side surface of the distal end portion 125a of the engaging claw 125. In FIG. 7, the thickest portion 130a of the sliding part 130 is shown by a black circle on the dashed line; however, the thickest portion 130a of the sliding part 130 does not necessarily have to be a point and can also be a prescribed range.

Figure 9:
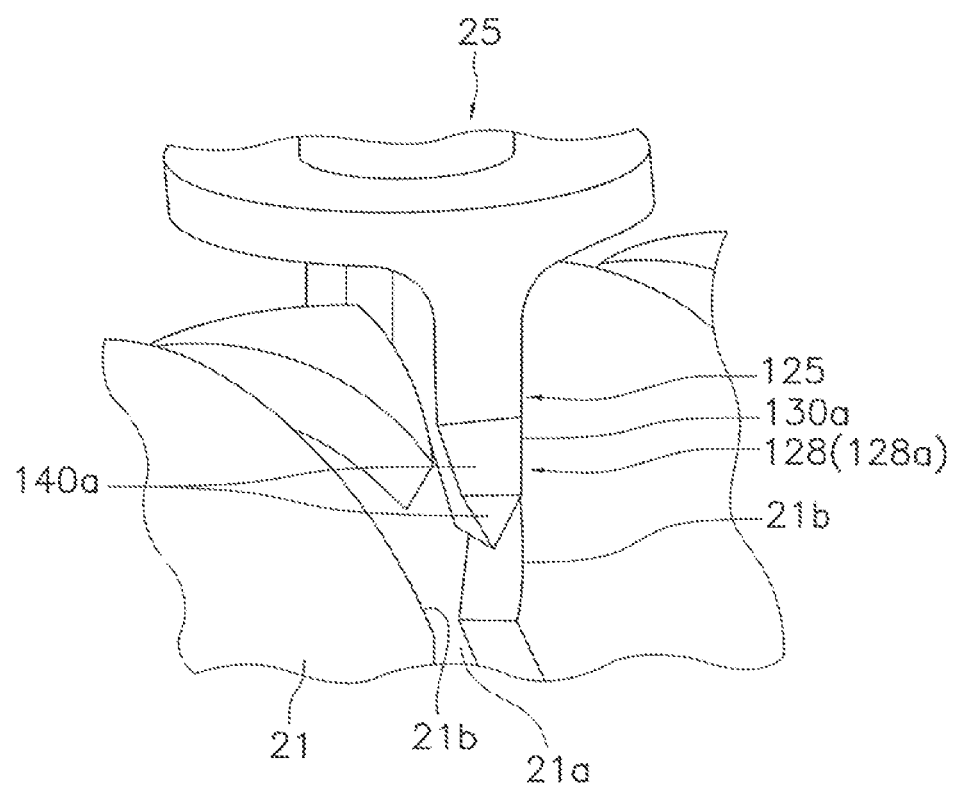
FIG. 9 is a perspective view showing the engagement relationship between the engaging unit and the traverse camshaft (part 2).

Additionally, when the sliding part 130 passes through the part where the spiral groove 21a intersects, the thickness of the thickest portion 130a is set so that the thickest portion 130a of the sliding part 130 contacts the corner 21b of the opening side of the spiral groove 21a. For example, when the sliding part 130 passes through the part where the spiral groove 21a intersects, as shown in FIG. 7 and FIG. 9, the thickest portion 130a of the sliding part 130 makes contact with one corner 21b of the opening side of the spiral groove 21a. In this state, the sliding part 130 disposed on one side surface side (the sliding part 130 on the side that contacts the corner 21b) slides along one wall (the wall on the center right side in FIG. 9) of the spiral groove 21a. Meanwhile, the sliding part 130 disposed on the other side surface slides along the other wall (the wall on the center left side in FIG. 9) of the spiral groove 21a. The details of this sliding movement will be described below.

The thickness of the distal end center portion 127 and the thickness of the protrusion 128 shown here are defined by the distances between the two side surfaces of each of the distal end center portion 127 and the protrusion 128. Additionally, the portion where the spiral groove 21a intersects refers to a range before and after the intersection of the spiral groove 21a. In other words, the portion that intersects with the spiral groove 21a is a prescribed range in the traveling direction of the slider 22 and the direction opposite of the traveling direction of the slider 22, based on the intersection of the spiral groove 21a.

As shown in FIG. 7, a recess 127a is formed in the center portion of the distal end center portion 127 in the direction along the spiral groove 21a. The recess 127a is formed in an engageable manner on the wall of the spiral groove 21a at the end of the traverse camshaft 21. For example, the recess 127a is formed recessed in a circular arc shape. Additionally, the recess 127a extends in a direction that is away from the traverse camshaft 21. For example, when the slider 22 passes through the end of the traverse camshaft 21, the recess 127a slides along one wall of the spiral groove 21a, that is, the wall on the center portion side of the traverse camshaft 21.

The non-sliding part 140 is outside of the spiral groove 21a. For example, the non-sliding part 140 of the distal end center portion 127 is between the sliding part 130 and the disc part 25e. This non-sliding part of the protrusion 128 corresponds to the portion that protrudes from the spiral groove 21a in the direction that is away from the bottom of the spiral groove 21a. That is, the non-sliding part 140 of the protrusion 128 is the portion that protrudes from the sliding part 130 toward the outside of the spiral groove 21a. The non-sliding part 140 of the protrusion 128 includes an edge portion 140a. Thus, the edge portion 140a of the protrusion 128 is always disposed outside of the spiral groove 21a. The non-sliding part 140 is also disposed outside of the spiral groove 21a when seen from the direction along the traverse camshaft 21.

The first axle bearing 26 shown in FIG. 4 rotatably supports the shaft portion 25a of the engaging unit 25. The first axle bearing 26 is a cylindrical sliding bearing made of a synthetic resin with a relatively high slidability, for example, a polyacetal resin, a fluorine resin, etc. The first axle bearing 26 comprises a fitting portion 26a, a protrusion 26b, and a supporting hole 26c.

As shown in FIG. 4 and FIG. 6, the fitting portion 26a is fitted in the through-hole 24f. The fitting portion 26a comprises a large-diameter flange portion 26d at the boundary between the protrusion 26b. The flange portion 26d positions the first axle bearing 26 by engaging a large-diameter portion 24g of the through-hole 24f (refer to FIG. 6). Specifically, the flange portion 26d contact the wall surface of the large-diameter portion 24g and regulates the movement of the first axle bearing 26 in the direction toward the traverse camshaft 21. Thus, the first axle bearing 26 is positioned in the axial direction. The protrusion 26b is smaller in diameter than the fitting portion 26a. The supporting hole 26c is a hole for rotatably supporting the shaft portion 25a. The supporting hole extends through the fitting portion 26a and the protrusion 26b.

As shown in FIG. 4 to FIG. 6, the stopper member 27 is formed in a plate shape. The stopper member 27 is, for example, a plate-like member made of metal such as a stainless steel alloy. The stopper member 27 is mounted to the disposing plane 24m and presses the first axle bearing 26 to stop the axle bearing. The stopper member 27 comprises a passage hole 27a through which the protrusion 26b can pass, and the stopper member 27 is fixed to the slider body 24 by the screw member 28 that is screwed to the screw mounting portion 24n of the slider body 24.

As shown in FIG. 4 and FIG. 6, the second axle bearing 29 is, for example, a rolling bearing, such as a roller bearing, a ball bearing, etc. The second axle bearing 29 is disposed in the through-hole 24f on the engaging part 25b side of the first axle bearing 26. That is, the second axle bearing 29 is disposed between the first axle bearing 26 and the engaging part 25b. A washer member 39 for suppressing the rattling of the second axle bearing 29 in the axial direction is disposed between the first axle bearing 26 and the second axle bearing 29. As shown in FIG. 6, the washer member 39 contacts the outer ring of the second axle bearing 29. Additionally, the inner ring of the second axle bearing 29 contacts a second surface 25h of the disc part 25e of the engaging unit 25 that is on the opposite side of the first surface 25g.

Intermediate Gear

As shown in FIG. 2, the intermediate gear 23 is integrally and rotatably mounted to the distal end of the traverse camshaft 21. As shown in FIG. 4, the intermediate gear 23 meshes with the pinion gear 12 via a decelerating mechanism 52. The intermediate gear 23 is integrally and rotatably mounted to the front end of the traverse camshaft 21 by a non-circular engagement. The decelerating mechanism 52 transmits the rotation of the pinion gear 12 to the intermediate gear 23. The decelerating mechanism 52 comprises a first gear 53 that meshes with the pinion gear 12 and a second gear 54 that integrally rotates with the first gear 53 and meshes with the intermediate gear 23. The first gear 53 has a greater number of teeth than the pinion gear 12. The second gear 54 has a smaller number of teeth than the intermediate gear 23. Thus, the rotation of the pinion gear 12 is transmitted to the intermediate gear after being decelerated in two stages. Accordingly, the speed of the back and forth movement of the spool 4 is slow, and it is possible to tightly wind the fishing line to the reel body 4a.

In this embodiment, the first gear 53 is integrally and rotatably coupled with the second gear 54 by non-circular engagement. The second gear 54 is rotatably supported by a support shaft 55 that is supported on both ends by the front portion of the housing part 2a (refer to FIG. 4). Here, the first gear 53 and the pinion gear 12 are helical gears, and the intermediate gear 23 and the second gear 54 are spur gears.

The spool shaft 15, as shown in FIG. 2, is disposed extending through the center portion of the pinion gear 12. The spool shaft 15 is reciprocally moved back and forth inside of the pinion gear 12 by an oscillating mechanism 6. The spool shaft 15 is supported rotatably and moveably in the axial direction in the center portion by an axle bearing 16 mounted in the nut 13 and in the rear portion by the rear portion inner peripheral surface of the pinion gear 12.

Configuration of the Rotor

The rotor 3, as shown in FIG. 2, is rotatably supported by the reel main body 2 via the pinion gear 12. The rotor 3 comprises a rotor body 30 that is integrally and rotatably coupled with the pinion gear 12, a first cover member 32, a second cover member 33, and a bail arm 36.

The rotor body 30 comprises a bottomed cylindrical connecting portion 30a rotatably coupled with the reel main body 2 via the pinion gear 12, a first rotor arm 30b, and a second rotor arm 30c. The rotor body 30 is, for example, made of an aluminum alloy or a magnesium alloy and it is integrally formed. The first rotor arm 30b extends forward from a first side of the rear end portion of the connecting portion 30a (the upper side in FIG. 2) at an interval with the connecting portion 30a. The second rotor arm 30c extends forward from a second side of the rear end portion of the connecting portion 30a that opposes the first side (the lower side in FIG. 2) at an interval with the connecting portion 30a.

A wall 31a is formed on the front portion of the connecting portion 30a. A boss section 31b is formed in the center portion of the wall 31a. A through-hole 31c is formed in the center portion of the boss section 31b. The front portion 12a of the pinion gear 12 and the spool shaft 15 are inserted in the through-hole 31c. A nut 13 for fixing the rotor 3 to the pinion gear 12 is disposed in the front portion of the wall 31a. A recess 31d having a circular space in which the front portion of the reel main body 2 can be housed is formed in the rear portion of the connecting portion 30a.

The first cover member 32 covers the outside of the first rotor arm 30b in the radial direction. A bail reversing mechanism (not diagrammed) that dividedly biases the bail arm 36 in the line winding position and the line releasing position is between the first cover member 32 and the first rotor arm 30b.

The bail arm 36, as shown in FIG. 2, is pivotally mounted to the distal end of the first and the second rotor arms 30b and 30c. The bail arm 36 is pivotable between the line releasing position and the line winding position. The bail arm 36 winds the fishing line onto the spool 4 with the rotation of the rotor 3 in the line winding direction when in the line winding position.

The bail arm 36 comprises a first bail support member 40, a second bail support member 42, and a line roller 41. The first bail support member 40 is pivotally mounted on the outer peripheral side of the distal end of the first rotor arm 30b. The second bail support member 42 is pivotally mounted on the outer peripheral side of the distal end of the second rotor arm 30c. The line roller 41 is rotatably mounted to the distal end of the first bail support member 40.

Additionally, the bail arm 36 comprises a fixed shaft (not diagrammed), a fixed shaft cover 44, and a bail 45. The fixed shaft supports the line roller 41. The fixed shaft is fixed to the distal end of the first bail support member 40 and is cantilevered to the first bail support member 40. The fixed shaft cover 44 is disposed on the distal end side of the fixed shaft. The bail 45 couples the fixed shaft cover 44 and the second bail support member 42.

Other Configurations

As shown in FIG. 2, a reverse rotation prevention mechanism 50 that prohibits the reversing of the rotor 3 is disposed inside of the cylindrical portion 2f of the reel main body 2. The reverse rotation prevention mechanism 50 comprises a roller-type one-way clutch 51 with a freely rotating inner ring. This reverse rotation prevention mechanism 50 constantly prohibits the reversing of the rotor 3 in the line delivering direction and will never be in a state that allows reversing. The reverse rotation prevention mechanism 50 is stopped by a cap member 20 that is fixed to the cylindrical portion 2f. The cap member 20 is, for example, screwed and fixed to the outer peripheral surface of the cylindrical portion 2f. Meanwhile, the reverse rotation prevention mechanism can be configured in order to be able to switch between a reverse permitted state and a reverse prohibited state.

The spool 4, as shown in FIG. 2, is disposed between the first rotor arm 30b and the second rotor arm 30c of the rotor 3 and is rotatably supported by the distal end of the spool shaft 15. The spool 4 moves back and forth along with the spool shaft 15, and the fishing line is wound onto the outer periphery of the reel body 4a by the rotor 3. The spool 4 is, for example, made of an aluminum alloy. A drag mechanism 60 that applies a brake to the spool 4 so that a set drag force is applied to the spool 4 is housed inside of the spool 4.

The drag mechanism 60, as shown in FIG. 2, applies a drag force to the spool 4 by applying a brake to the rotation of the spool 4 in the line delivering direction. The drag mechanism 60 comprises a drag knob assembly 65 for manually adjusting the drag force and a friction part 66 that is pressed to the spool 4 side by the drag knob assembly 65 to adjust the drag force. The drag knob assembly 65 is disposed in the front portion of the spool 4. The friction portion 66 is disposed inside of the spool 4.

Operation of the Oscillating Mechanism

In the above-described spinning reel 100, when the handle 1 is rotated, the drive shaft 10 rotates, and the pinion gear 12 that meshes with the drive gear 11 rotates. When the pinion gear 12 rotates, the rotor 3 rotates, the intermediate gear 23 rotates via the decelerating mechanism 52, and the traverse camshaft 21 rotates. When the traverse camshaft 21 rotates, the slider 22 is reciprocally moved in the anteroposterior direction along the traverse camshaft 21. The spool 4 moves back and forth with this reciprocating movement of the slider 22.

Here, the engagement relationship of the engaging claw 125 and the spiral groove 21a when the slider 22 moves along the spiral groove 21a of the traverse camshaft 21 will be explained below. As described above, when the traverse camshaft 21 rotates, the engaging part 25b of the engaging unit 25 that is mounted on the slider body 24 will be guided to the spiral groove 21a when engaged with the spiral groove 21a. For example, the engaging claw 125 will move back and forth due to the action of the spiral groove 21a while rotating around the axis of the shaft portion 25a when engaged with the spiral groove 21a. Thus, in the case that the engaging claw 125 is guided to the spiral groove 21a, the sliding part 130 at the distal end portion 125a of the engaging claw 125 will slide along the spiral groove 21a.

In particular, as shown in FIG. 8, when the engaging claw 125 moves along the spiral groove 21a, the sliding part 130 of the distal end portion 125a of the engaging claw 125 will slide along the wall and the bottom of the spiral groove 21a. As described above, this sliding part 130 is configured by a side surface 227a that opposes the wall of the spiral groove 21a and the end surface 227b that opposes the bottom of the spiral groove 21a. For this reason, the sliding part 130 is constantly in surface contact with the spiral groove 21a and slides along the spiral groove 21a. Specifically, since the thickness of the sliding part 130 on the protrusion 128 side is larger than the thickness of the center portion of the distal end center portion 127, the sliding part 130 of the distal end center portion 127 and the sliding part 130 of the protrusion 128 will slide along the spiral groove 21a in a state in which the backlash between the sliding part 130 on the protrusion 128 side and the spiral groove 21a is suppressed by the sliding part 130 on the protrusion 128 side.

Additionally, as shown in FIG. 9, in the case that the engaging claw 125 passes through the vicinity of the intersection of the spiral groove 21a, until the engaging claw 125 reaches the intersection of the spiral groove 21a, the thickest portion 130a of the sliding part 130 (the thickest portion on one side) will make contact with the corner 21b of the spiral groove 21a on the opening side (the corner on the center right side in FIG. 9). In this configuration, the sliding part 130 on the side, where this thickest portion 130a makes contact with the corner 21b, will slide along the wall where the thickest portion 130a slides (one wall of the wall on the center right side in FIG. 9). Also, in this configuration, the sliding part 130 on the opposite side will slide along the other wall of the spiral groove 21a (the wall on the center left side in FIG. 9; the wall that opposes the above-described one wall).

On the other hand, when the engaging claw 125 passes through the intersection of the spiral groove 21a, the thickest portion 130a of the sliding part 130 (the thickest portion on one side that is the opposite side of the above) will make contact with the corner 21b of the spiral groove 21a on the opening side (the corner in the center lower left in FIG. 9).

In this state, the sliding part 130 on the side where this thickest portion 130a contacts the corner 21b will slide along one wall of the spiral groove 21a (the center lower left wall in FIG. 9). In this configuration, the sliding part 130 on the opposite side will also slide along the other wall of the spiral groove 21a (the wall on the center right side of FIG. 9 described above).

Figure 10:
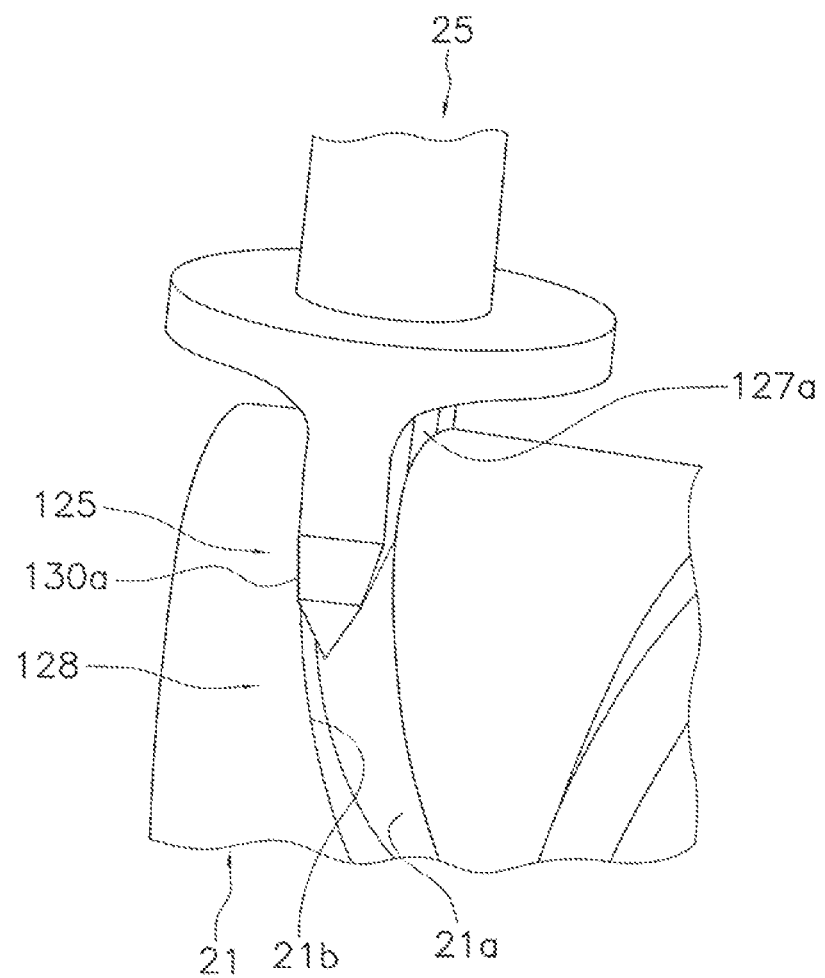
FIG. 10 is a perspective view showing the engagement relationship between the engaging unit and the traverse camshaft (part 3).

Additionally, as shown in FIG. 10, when the engaging claw 125 passes through the end portion of the traverse camshaft 21, the recess 127a on one side in the distal end center portion 127 of the engaging claw 125 will slide along the wall on the center portion side of the traverse camshaft 21. The sliding part 130 on this recess 127a side will also slide along the wall on the center portion side of the traverse camshaft 21. On the other hand, the thickest portion 130a of the sliding part 130 on the opposite side of the above-described recess 127a makes contact with the corner 21b of the spiral groove 21a on the opening side. The sliding part 130 on the side where this thickest portion 130a makes contact with the corner 21b will also slide along the wall of the spiral groove 21a (the left side wall in FIG. 10). In this way, even in the case in which the engaging claw 125 passes through the end portion of the traverse camshaft 21, the sliding part 130 moves along the spiral groove 21a due to the surface contact of the sliding part 130 and the spiral groove 21a.

In this configuration, in the present oscillating mechanism 6, when the slider 22 reciprocally moves along the traverse camshaft 21, the sliding part 130 of the engaging claw 125 will constantly be in surface contact with the spiral groove 21a and moves along the spiral groove 21a. In particular, the sliding part 130 of the engaging claw 125 will move along the spiral groove 21a while being in surface contact with the spiral groove 21a in a state in which the non-sliding part 140 of the protrusion 128 of the engaging claw 125, for example the edge portion 140a of the protrusion 128, is constantly disposed outside of the spiral groove 21a. With this, the engaging claw 125 can be smoothly moved along the spiral groove 21a without the edge portion 140a of the protrusion 128a on the front end side interfering with the spiral groove 21a. In other words, the oscillating mechanism 6 can be smoothly operated.

Embodiment 2

The present second embodiment is further configured in the following way in order to reduce the sizes of the slider body 24, the slider 22, and the oscillating mechanism 6.

Meanwhile, the same configurations are given the same reference symbols, and their explanations have been omitted.

Figure 12:
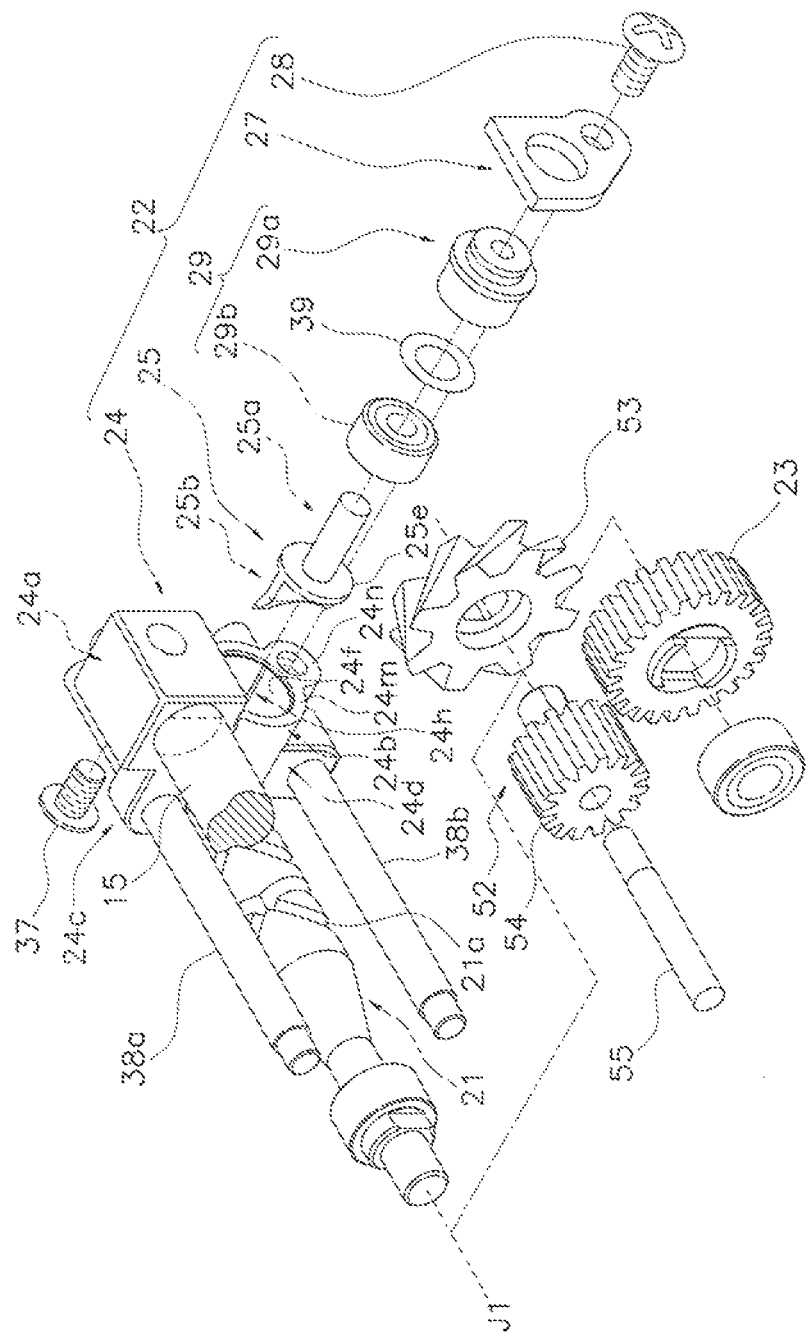
FIG. 12 is an exploded perspective view of an oscillating mechanism (one example of a reciprocating mechanism).
Figure 13:
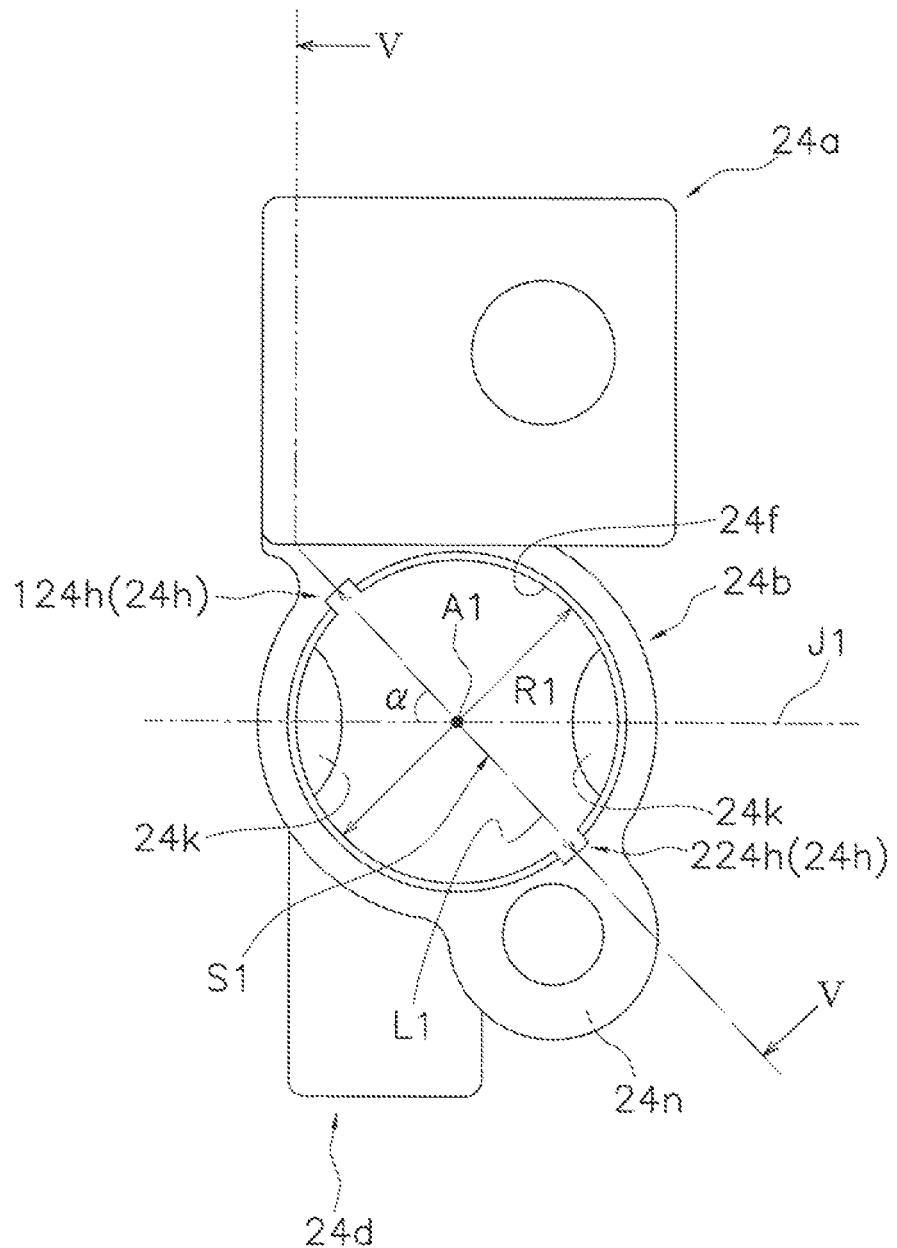
FIG. 13 is a side view of the slider body (one example of a sliding unit).
Figure 14:
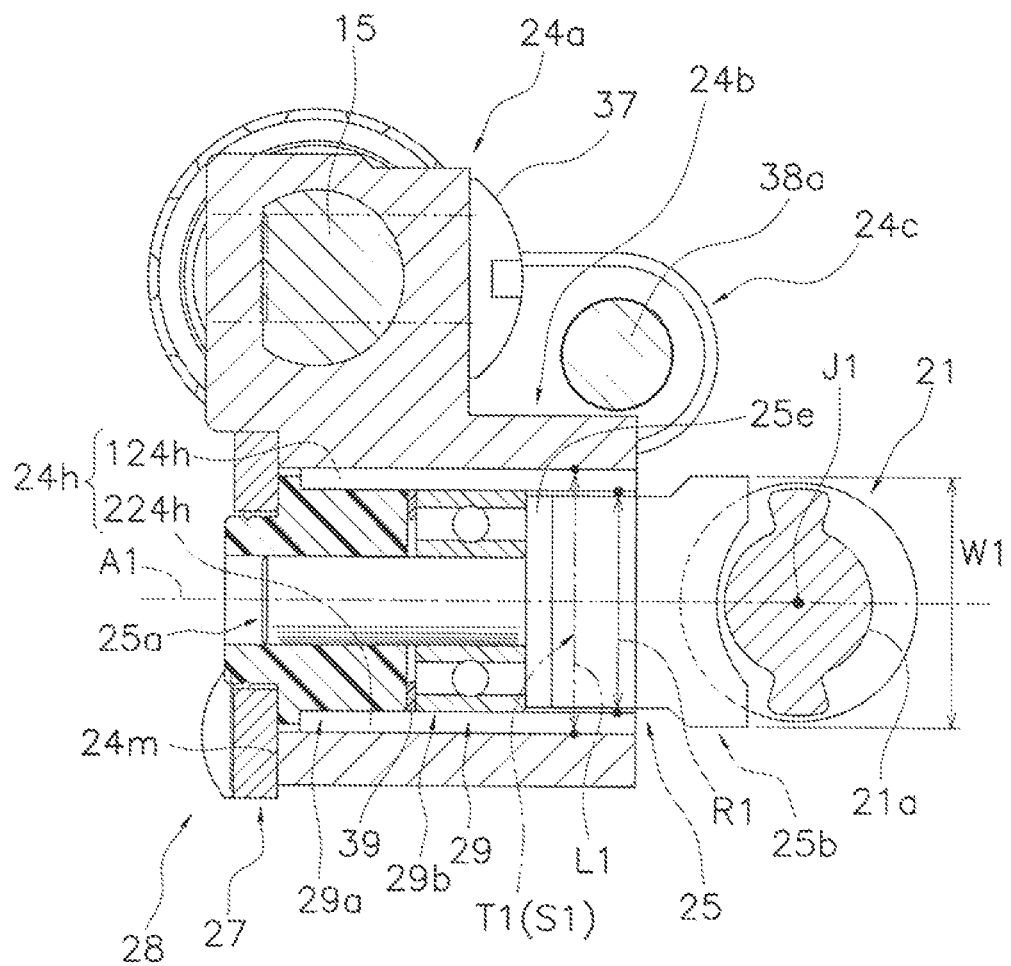
FIG. 14 is a V-V cross-sectional view shown in FIG. 14.

In the present second embodiment, as shown in FIG. 12, FIG. 13, and FIG. 14, the supporting hole 24f of the slider body 24 comprises a groove 24h and a regulating part 24k (refer to FIG. 13). The groove 24h is formed on the inner peripheral surface of the supporting hole 24f so as to extend in the penetration direction A1 of the supporting hole 24f. Here, the penetration direction A1 of the supporting hole 24f is defined as the axial direction that passes through the center of the supporting hole 24f. Additionally, the groove 24h is a portion through which the engaging claw 25b of the engaging unit 25 mentioned below passes.

In particular, as shown in FIG. 13, the groove 24h comprises a first groove 124h and a second groove 224h. The first groove 124h and the second groove 224h are formed opposing each other on the inner peripheral surface of the supporting hole 24f. Additionally, both the first groove 124h and the second groove 224h are formed on the inner peripheral surface of the supporting hole 24f along the penetration direction A1 of the supporting hole 24f.

Also, the formation position of the first groove 124h and the second groove 224h is the portion where the wall thickness of the engaging unit mounting portion 24b (the outer peripheral part of the supporting hole 24O is thick. Specifically, the first groove 124h is formed on the inner peripheral surface of the supporting hole 24f in the portion where the spool shaft connecting portion 24a and the engaging unit mounting portion 24b are connected. The second groove 224h is formed on the inner peripheral surface of the supporting hole 24f in the portion where the engaging unit mounting portion 24b and the screw mounting portion 24n are connected.

Additionally, as shown in FIG. 13 and FIG. 14, the straight line S1 that connects the first groove 124h and the second groove 224h (shown in FIG. 14 by the line segment T1) crisscrosses with respect to the axis line J1 of the traverse camshaft 21. In other words, the straight line S1 (line segment T1) intersects the axis J1 when seen from the penetration direction A1 of the supporting hole 24f. Here, the line segment T1 is a line segment that connects the bottom of the first groove 124h and the bottom of the second groove 224h.

More specifically, the straight line S1 (line segment T1) crisscrosses in the range of 40 degrees and 60 degrees with respect to the axis J1. That is, as shown in FIG. 13, when seen from the penetration direction A1 of the supporting hole 24f, the intersection is at an angle α in the range of 40 degrees to 60 degrees; as shown in FIG. 14, in the penetration direction A1 of the supporting hole 24f, the straight line S1 (line segment T1) is disposed at a prescribed interval from the axis J1. Also, even when seen from the direction of the axis J1 of the traverse camshaft 21, the straight line S1 (line segment T1) is disposed at a prescribed interval from the axis J1.

Meanwhile, here, as shown in FIG. 13, the above-described straight line S1 (line segment T1) is defined by a straight line that passes through the center point of the bottom of the first groove 124h and the center point of the bottom of the second groove 224h when seen from the penetration direction A1 of the supporting hole 24f.

The regulating part 24k is for regulating the position of the penetration direction A1 of the engaging unit 25. As shown in FIG. 13, the regulating part 24k is formed on the inner peripheral surface of the supporting hole 24f. Specifically, a pair of regulating parts 24k is formed on the inner peripheral surface of the supporting hole 24f, so that they oppose each other. The regulating part 24k protrudes in a circular arc shape toward the axis of the supporting hole 24f.

As shown in FIG. 12, the first guide portion 24c is formed protruding from the wall surface of the spool shaft connecting portion 24a on the traverse camshaft 21 side. A first guide shaft 38a for guiding the slider 22 in the anteroposterior direction is inserted in the first guide portion 24c. Both ends of the first guide shaft 38a are supported by the housing part 2a. Additionally, the second guide portion 24d is formed protruding downward from the lower surface of the engaging unit mounting portion 24b. A second guide shaft 38b for guiding the slider 22 in the anteroposterior direction is inserted in the second guide hole 24p. Both ends of the second guide shaft 38b are supported by the housing part 2a.

The engaging unit 25, as shown in FIG. 12 and FIG. 14, is disposed in the supporting hole 24f of the slider body 24 (the engaging unit mounting portion 24b). The engaging unit 25 comprises a shaft portion 25a (one example of a support part) and an engaging claw 25b. The shaft portion 25a is rotatably supported by the supporting hole 24f. In particular, the shaft portion 25a is rotatably supported by a rotating support part 29 mentioned below. The shaft portion 25a is integrally formed with the engaging claw 25b. Specifically, a disc part 25e is integrally formed with one end portion of the shaft portion 25a, and the disc part 25e is integrally formed with the engaging claw 25b (refer to FIG. 12).

As shown in FIG. 12, FIG. 13, and FIG. 14, the engaging claw 25b can be engaged with the spiral groove 21a. The engaging claw 25b is disposed on the shaft portion 25a. The engaging claw 25b protrudes toward the traverse camshaft 21 in a plate shape. Specifically, the engaging claw 25b is disposed on one end portion of the shaft portion 25a so that the width W1 of the engaging claw 25b will be longer than the radius R1 of the supporting hole 24f. The engaging claw 25b is also disposed on one end portion of the shaft portion 25a so that the width W1 of the engaging claw 25b will be shorter than the length of the line segment L1 connecting the bottom of the first groove 124h and the bottom of the second groove 224h.

This kind of engaging claw 25b can be engaged with the spiral groove 21a. For example, the engaging claw 25b engages with the spiral groove 21a with the two end portions of the engaging claw 25b passing through the groove 24h (the first groove 124h and the second groove 224h). Additionally, a part of both end portions of the engaging claw 25b is disposed outside of the spiral groove 21a. Both side surfaces of the engaging claw 25b can also come in contact with the regulating part 24k of the supporting hole 24f of the slider body 24. The position of the engaging unit 25 with respect to the slider body 24 is regulated so that both end surfaces of the engaging claw 25b make contact with the regulating part 24k.

By configuring the slider 22 in this way, when the traverse camshaft 21 rotates, the engaging claw 25b is guided to the spiral groove 21a, and the slider 22 moves in the antero-posterior direction along the traverse camshaft 21.

As shown in FIG. 12 and FIG. 14, the rotation support part 29 rotatably supports the shaft portion 25a of the rotation support part 25. The rotation support part 29 is disposed on the inner peripheral of the supporting hole 24f of the slider body 24. The rotation support part 29 comprises a first axle bearing 29a and a second axle bearing 29b.

The first axle bearing 29a is, for example, a cylindrical sliding bearing. The first axle bearing 29a is disposed on the inner periphery of the supporting hole 24f of the slider body 24. For example, the first axle bearing 29a is fitted into the supporting hole 24f. With this, the first axle bearing is immovably fixed in the penetration direction A1 of the supporting hole 24f with respect to the supporting hole 24f.

The second axle bearing 29b is, for example, a rolling bearing, such as a ball bearing, a roller bearing, etc. The second axle bearing 29b is disposed on the inner periphery of the supporting hole 24f of the slider body 24. The second axle bearing 29b is disposed in the supporting hole 24f on the engaging claw 25b side of the first axle bearing 29a. That is, the second axle bearing is disposed between the first axle bearing 29a and the engaging claw 25b.

A washer member 39 for suppressing the rattling of the second axle bearing 29b in the axial direction is disposed between the first axle bearing 29a and the second axle bearing 29b. As shown in FIG. 14, the washer member 39 makes contact with the outer ring of the second axle bearing 29b. Additionally, the inner ring of the second axle bearing 29b makes contact with the disc part 25e of the engaging claw 25b.

As shown in FIG. 12 and FIG. 14, the stopper member 27 is formed in a plate shape. The stopper member 27 is disposed on the disposing plane 24m of the engaging unit mounting portion 24b and presses the first axle bearing 29a to stop the axle bearing. The stopper member 27 is fixed to the slider body 24 by a screw member 28 that is screwed to the screw mounting portion 24n of the slider body 24.

Other Configurations

As shown in FIG. 2, a reverse rotation prevention mechanism 50 that prohibits the reversing of the rotor 3 is disposed inside of the cylindrical portion 2f of the reel main body 2. The reverse rotation prevention mechanism 50 comprises a roller-type one-way clutch 51 with a freely rotating inner ring. This reverse rotation prevention mechanism 50 constantly prohibits the reversing of the rotor 3 in the line delivering direction and will never be in a state that allows reversing. The reverse rotation prevention mechanism 50 is stopped by a cap member 20 that is fixed to the cylindrical portion 2f. Meanwhile, the reverse rotation prevention mechanism can be configured in order to be able to switch between a reverse permitted state and a reverse prohibited state.

Other Embodiments

One embodiment of the present invention is described above, but the present invention is not limited to the above-described embodiment; various modifications can be made without departing from the scope of the invention. Specifically, the plurality of embodiments and modified examples described in the present Specification can be freely combined according to necessity.

(a) In the above-described embodiment, an example was shown in which the first groove 124h and the second groove 224h are formed in the supporting hole 24f so that a straight line S1 that connects the first groove 124h and the second groove 224h, when seen from the penetration direction A1 of the supporting hole 24f of the slider body 24, will crisscross with respect to the axis J1 of the traverse camshaft 21.

However, in the case that the portion of the slider body 24 where the wall thickness is thick can be secured in a position that is perpendicular to the axis J1 of the traverse camshaft 21, the first groove 124h and the second groove 224h can be formed in the supporting hole 24f so that a straight line S1 that connects the first groove 124h and the second groove 224h, when seen from the penetration direction A1 of the supporting hole 24f, will be perpendicular with respect to the axis J1 of the traverse camshaft 21.

In this configuration, by forming the first groove 124h and the second groove 224h so that the straight line S1 is perpendicular to the axis J1, the first groove 124h and the second groove 224h can be formed in the portion of the slider body 24 where the wall thickness is thick. With this, the strength of the slider body 24 can be improved.

(b) In the above-described embodiment, an example was shown in which the rotation support part 29 comprises a first axle bearing 29a and a second axle bearing 29b, but the rotation support part 29 can be configured in any way that allows for the engaging unit 25 to be rotatably supported. For example, the rotation support part 29 can be configured by one of either the first axle bearing 29a or the second axle bearing 29b.

The above-described embodiment can be expressed as follows.

(A) The present oscillating mechanism 6 is for reciprocally moving a spool 4 to which a fishing line is wound with respect to a reel main body 2.

The oscillating mechanism 6 comprises a traverse camshaft 21, a slider 22, and an intermediate gear 23. The traverse camshaft 21 comprises a spiral groove 21*a*. The traverse camshaft 21 rotates in conjunction with the winding operation of a handle 1 that is attached to the reel main body 2. The slider 22 comprises a slider body 24, an engaging unit 25, a rotation support part 29, a stopper member 27, and a screw member 28. The slider body 24 comprises a supporting hole 24*f* that rotatably supports the engaging unit 25. A groove 24*h* that extends in the penetration direction A1 of the supporting hole 24*f* is provided on the inner peripheral surface of the supporting hole 24*f* of the slider body 24. The engaging unit 25 comprises an engaging claw 25*b* that can engage with the spiral groove 21*a*.

In the present oscillating mechanism 6, a groove 24*h* that extends in the penetration direction A1 of the supporting hole 24*f* is provided on the inner peripheral surface of the supporting hole 24*f* of the slider body 24. For this reason, even if the width of the engaging claw 25*b* of the engaging unit 25 is formed to be wide, this engaging claw 25*b* can be engaged with the spiral groove 21*a* of the traverse camshaft 21 by guiding the engaging claw 25*b* along the groove 24*h*. With this, the engaging claw 25*b* can be smoothly moved along the spiral groove 21*a* of the traverse camshaft 21. Additionally, since the groove 24*h* only partially enlarges the inner peripheral surface of the supporting hole 24*f* of the sliding unit 24, when compared to when the entire diameter R1 of the supporting hole 24*f* of the sliding unit 24 is enlarged, it is possible to reduce the size of the slider body 24.

As described above, in the present oscillating mechanism 6, the size of the slider body 24 can be reduced without reducing the smoothness of the back and forth movement of the slider body 24.

(B) In the present oscillating mechanism 6, the groove 24*h* comprises a first groove 124*h* and a second groove 224*h* that is provided in a position opposing the first groove 124*h*.

In this configuration, the groove 24*h* comprises a first groove 124*h* and a second groove 224*h* that is disposed in a position opposing the first groove 124*h*. For this reason, even if the width of the engaging claw 25*b* of the engaging unit 25 is wide, the engaging claw 25*b* of the engaging unit 25 can be guided along the first groove 124*h* and the second groove 224*h*. Thus, this engaging claw 25*b* can be engaged with the spiral groove 21*a* of the traverse camshaft 21. Accordingly, the engaging claw 25*b* can move smoothly along the spiral groove 21*a* of the traverse camshaft 21. Additionally, since the first groove 124*h* and the second groove 224*h* only partially enlarge the inner peripheral surface of the supporting hole 24*f* of the sliding unit 24, when compared to when the entire diameter R1 of the supporting hole 24*f* of the sliding unit 24 is enlarged, it is possible to further reduce the size of the slider body 24.

(C) In the present oscillating mechanism 6, a straight line S1 connecting the first groove 124*h* and the second groove 224*h*, when seen from the penetration direction A1 of the supporting hole 24*f*, intersects the axis J1 of the traverse camshaft 21.

In this configuration, in the case that the portion of the slider body 24 where the wall thickness is thick is disposed in a position that intersects with the axis J1 of the traverse camshaft 21, the size of the slider body 24 can be further reduced without decreasing the strength of the slider body 24 by disposing the first groove 124*h* and the second groove 224*h* in the supporting hole 24*f* of the slider body 24 so that the above-described straight line S1 intersects with the axis J1 of the traverse camshaft 21.

(D) In the present oscillating mechanism 6, a straight line S1 connecting the first groove 124*h* and the second groove 224*h*, when seen from the penetration direction A1 of the supporting hole 24*f*, intersects with the axis J1 of the traverse camshaft 21 in a range of 40 degrees to 60 degrees.

In this configuration, when the portion of the slider body 24 where the wall thickness is thick is disposed in a range of 40 degrees to 60 degrees with respect to the axis J1 of the traverse camshaft 21, the size of the slider body 24 can be further reduced without decreasing the strength of the slider body 24 by disposing the first groove 124*h* and the second groove 224*h* in the supporting hole 24*f* of the slider body 24 so that the above-described straight line S1 intersects with the axis J1 of the traverse camshaft 21 in a range of 40 degrees to 60 degrees.

(E) In the present oscillating mechanism 6, the width W1 of the engaging claw 25*b* is longer than the diameter R1 of the supporting hole 24*f*. Additionally, the width W1 of the engaging claw 25*b* is shorter than the length of the line segment L1 connecting the bottom of the first groove 124*h* and the bottom of the second groove 224*h*.

In this configuration, by forming the engaging claw 25*b* so that the width W1 of the engaging claw 25*b* is longer than the diameter R1 of the supporting hole 24*f* and is shorter than the line segment L1 connecting the bottom of the first groove 124*h* and the bottom of the second groove 224*h*, the engaging claw 25*b* can be smoothly guided along the first groove 124*h* and the second groove 224*h*, and the engaging claw 25*b* can be engaged with the spiral groove 21*a* of the traverse camshaft 21.

(F) In the present oscillating mechanism 6, the engaging unit 25 further comprises a shaft part 25*a* that is rotatably supported by the supporting hole 24*f*.

In this configuration, in the engaging unit 25, the support part 25*a* is rotatably supported by the supporting hole 24*f* of the slider body 24 in a state in which the engaging claw 25*b* is engaged with the traverse camshaft 21. Thus, the slider body 24 can be smoothly moved along the traverse camshaft 21 via the engaging unit 25.

(G) In the present oscillating mechanism 6, the shaft portion 25*a* of the engaging unit 25 is rotatably supported by a rotation support part 29 that is disposed on the inner periphery of the supporting hole 24*f* of the slider body 24.

In this configuration, the shaft portion 25*a* of the engaging unit 25 can be smoothly rotated with respect to the inner periphery of the supporting hole 24*f* of the slider body 24 with the rotation support part 29. That is, the slider body 24 can move smoothly along the traverse camshaft 21 via the engaging unit 25.

What is claimed is:

1. A reciprocating mechanism for a fishing reel for reciprocally moving a spool with respect to a reel main body so as to wind a fishing line onto the spool equally and evenly, the reciprocating mechanism comprising:
   a traverse camshaft having a cam groove and being configured to rotate in conjunction with a winding operation of a handle attached to the reel main body; and
   an engaging unit having an engaging claw engaging the cam groove of the traverse camshaft, the engaging claw having a front end portion extending in a direction along the cam groove, the front end portion being longer than a depth of the cam groove, and having a first side, a second side, an end, and a recess disposed on the first side in a center portion of the engaging claw in the direction along the cam groove, the recess being engageable with a wall of the cam groove at an end of the traverse camshaft.

2. The reciprocating mechanism for the fishing reel recited in claim 1, wherein
the front end portion of the engaging claw protrudes in a direction away from a bottom of the cam groove.

3. The reciprocating mechanism for the fishing reel recited in claim 1, wherein
the front end portion of the engaging claw and a rear end portion of the engaging claw define a width therebetween, and the width between the front end portion and the rear end portion is larger than a diameter of the traverse camshaft.

4. The reciprocating mechanism for the fishing reel recited in claim 1, wherein
the engaging claw comprises a sliding part disposed inside of the cam groove and configured to slide with the cam groove, and a non-sliding part disposed outside of the cam groove.

5. The reciprocating mechanism for the fishing reel recited in claim 4, wherein
the sliding part is at least partially disposed within the cam groove when viewed in a direction along the traverse camshaft.

6. The reciprocating mechanism for a fishing reel recited in claim 4, wherein
the non-sliding part is in the front end portion of the engaging claw, and protrudes from the sliding part in a direction toward an outside of the cam groove.

7. The reciprocating mechanism for the fishing reel recited in claim 4, wherein
a thickness of at least a part of the sliding part in the front end portion of the engaging claw is larger than a thickness of the center portion of the engaging claw in the direction along the cam groove.

8. The reciprocating mechanism for the fishing reel recited in claim 7, wherein
a portion of the sliding part opposing a corner of the cam groove on an opening side of the cam groove is a thickest portion of the sliding part.

9. The reciprocating mechanism for the fishing reel recited in claim 1, wherein
a rear end portion of the engaging claw in the direction along the cam groove is longer than the depth of the cam groove,
and the rear end portion of the engaging claw protrudes in a direction of at least one of a direction away from a bottom of the cam groove and the direction along the cam groove.

10. A reciprocating mechanism for a fishing reel for reciprocally moving a spool with respect to a reel main body so as to wind a fishing line onto the spool equally and evenly, the reciprocating mechanism comprising:
a traverse camshaft having a cam groove and being configured to rotate in conjunction with a winding operation of a handle attached to the reel main body;
an engaging unit having an engaging claw engaging the cam groove of the traverse camshaft, the engaging claw having a front end portion extending in a direction along the cam groove, the front end portion being longer than a depth of the cam groove;
a sliding unit having a supporting hole rotatably supporting the engaging unit; and
a groove extending in a penetration direction of the supporting hole, and being disposed on an inner peripheral surface of the supporting hole of the sliding unit.

11. The reciprocating mechanism for the fishing reel recited in claim 10, wherein
the groove is a first groove, and a second groove is disposed in a position opposing the first groove.

12. The reciprocating mechanism for the fishing reel recited in claim 11, wherein
the first groove and the second groove are connected by a straight line when seen from the penetration direction of the supporting hole, the straight line intersecting a longitudinal axis of the traverse camshaft.

13. The reciprocating mechanism for the fishing reel recited in claim 12, wherein
the straight line is perpendicular to the longitudinal axis of the traverse camshaft.

14. The reciprocating mechanism for the fishing reel recited in claim 12, wherein
the first groove and the second groove are connected by a straight line when seen from the penetration direction of the supporting hole, the straight line intersecting in a range of 40 degrees to 60 degrees along a longitudinal axis of the traverse camshaft.

15. The reciprocating mechanism for the fishing reel recited in claim 11, wherein
the engaging claw has a width, and the width of the engaging claw is longer than a diameter of the supporting hole and is shorter than a line segment connecting a bottom of the first groove and a bottom of the second groove.

16. The reciprocating mechanism for the fishing reel recited in claim 10, wherein
the engaging unit further comprises a support part rotatably supported by the supporting hole.

17. The reciprocating mechanism for the fishing reel recited in claim 16, wherein
the support part is rotatably supported by a rotation support part disposed on the inner peripheral surface of the supporting hole.

* * * * *